US012686389B1

(12) United States Patent
Mueller et al.

(10) Patent No.: US 12,686,389 B1
(45) Date of Patent: Jul. 21, 2026

(54) VEHICLE THERMAL CONTROL SYSTEM

(71) Applicant: Zoox, Inc., Foster City, CA (US)

(72) Inventors: Paul Raymond Mueller, San Leandro, CA (US); Qinling Zheng, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 207 days.

(21) Appl. No.: 17/886,996

(22) Filed: Aug. 12, 2022

Related U.S. Application Data

(60) Provisional application No. 63/232,764, filed on Aug. 13, 2021.

(51) Int. Cl.
| | |
|---|---|
| *B60W 30/18* | (2012.01) |
| *B60H 1/00* | (2006.01) |
| *G01C 21/34* | (2006.01) |
| *G06N 20/00* | (2019.01) |

(52) U.S. Cl.
CPC ........... *B60W 30/18* (2013.01); *B60H 1/0073* (2019.05); *G01C 21/3469* (2013.01); *G06N 20/00* (2019.01); *B60H 2001/00733* (2019.05); *B60W 2510/244* (2013.01); *B60W 2520/10* (2013.01); *B60W 2540/043* (2020.02); *B60W 2555/20* (2020.02); *B60W 2556/40* (2020.02)

(58) Field of Classification Search
CPC ........... B60W 30/18; B60W 2510/244; B60W 2520/10; B60W 2540/043; B60W 2555/20; B60W 2556/40; B60H 1/0073; B60H 2001/00733; G01C 21/3469; G06N 20/00
See application file for complete search history.

(56) References Cited

U.S. PATENT DOCUMENTS

| | | | |
|---|---|---|---|
| 2011/0166740 A1* | 7/2011 | Desborough | B60W 10/08 701/31.4 |
| 2016/0025508 A1* | 1/2016 | Meyer | G01C 21/3469 701/410 |
| 2018/0203443 A1* | 7/2018 | Newman | B60L 1/00 |
| 2019/0302877 A1* | 10/2019 | Hu | G07C 5/008 |
| 2020/0117204 A1* | 4/2020 | Lindemann | B60L 53/63 |
| 2020/0393260 A1* | 12/2020 | Falck | G06Q 10/08355 |
| 2021/0174678 A1* | 6/2021 | Wright | G06F 9/5072 |
| 2021/0300324 A1* | 9/2021 | Legnedahl | B60L 58/12 |
| 2023/0035353 A1* | 2/2023 | Hermez | G07C 5/008 |
| 2024/0001735 A1* | 1/2024 | Kim | B60H 1/00735 |

* cited by examiner

*Primary Examiner* — Faris S Almatrahi
*Assistant Examiner* — Dana F Artimez
(74) *Attorney, Agent, or Firm* — Lee & Hayes, P.C.

(57) ABSTRACT

This disclosure describes methods, apparatuses, and systems for determining energy budget data based at least in part on route data and/or environmental data and controlling one or more settings associated with a vehicle based at least in part on the energy budget data. For example, a system can receive route data associated with a route for a vehicle to travel from a first location to a second location. The system can also receive environmental data representing an environment associated with the route data. The system can determine, based at least in part on the route data or the environmental data, energy budget data. The system can further control at least one of a propulsion system of the vehicle, a computing system of the vehicle, or a thermal control system of the vehicle based at least in part on the energy budget data.

20 Claims, 8 Drawing Sheets

300

Figure 1:
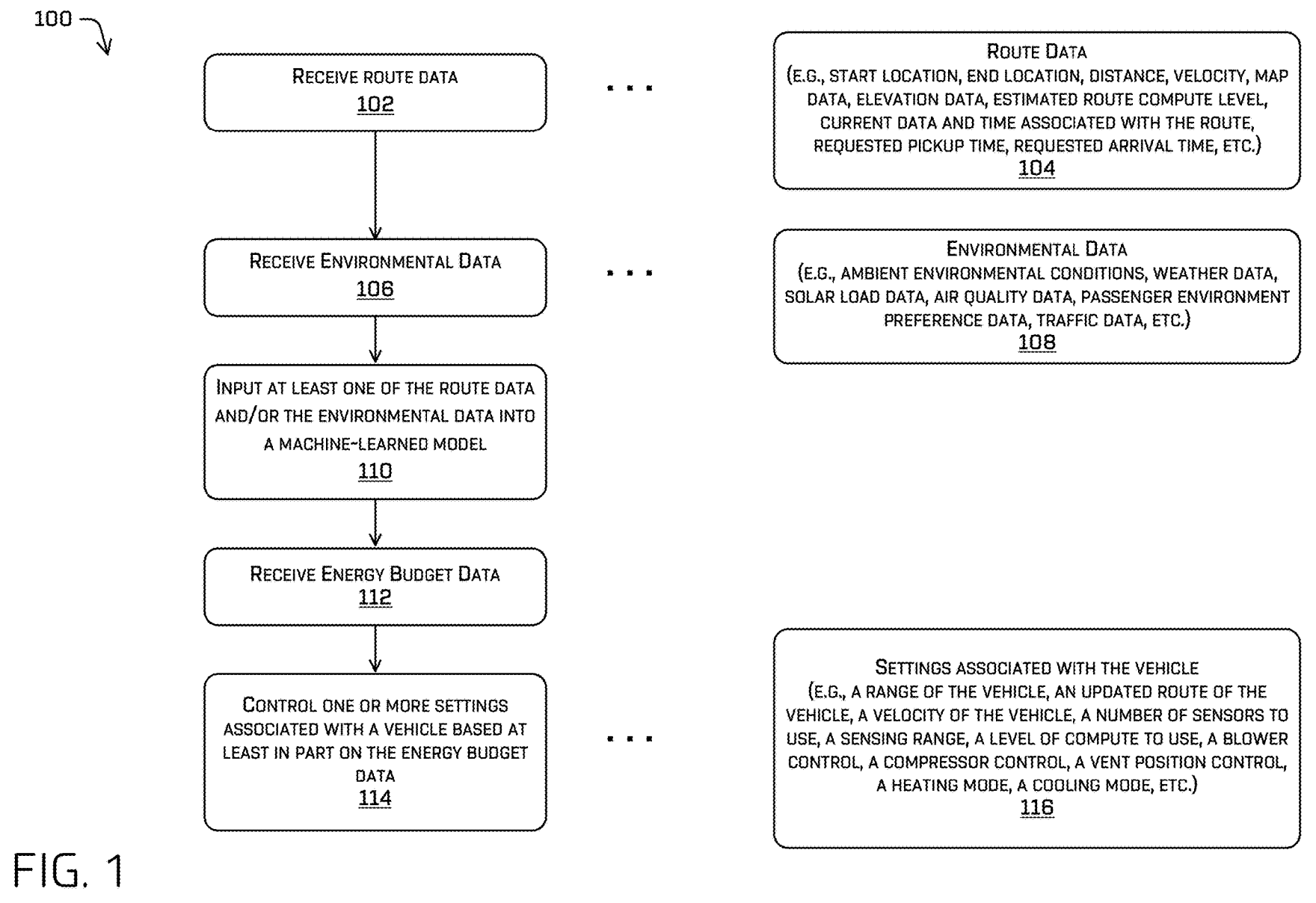

100

ROUTE DATA
(E.G., START LOCATION, END LOCATION, DISTANCE, VELOCITY, MAP DATA, ELEVATION DATA, ESTIMATED ROUTE COMPUTE LEVEL, CURRENT DATA AND TIME ASSOCIATED WITH THE ROUTE, REQUESTED PICKUP TIME, REQUESTED ARRIVAL TIME, ETC.)
104

ENVIRONMENTAL DATA
(E.G., AMBIENT ENVIRONMENTAL CONDITIONS, WEATHER DATA, SOLAR LOAD DATA, AIR QUALITY DATA, PASSENGER ENVIRONMENT PREFERENCE DATA, TRAFFIC DATA, ETC.)
108

SETTINGS ASSOCIATED WITH THE VEHICLE
(E.G., A RANGE OF THE VEHICLE, AN UPDATED ROUTE OF THE VEHICLE, A VELOCITY OF THE VEHICLE, A NUMBER OF SENSORS TO USE, A SENSING RANGE, A LEVEL OF COMPUTE TO USE, A BLOWER CONTROL, A COMPRESSOR CONTROL, A VENT POSITION CONTROL, A HEATING MODE, A COOLING MODE, ETC.)
116

RECEIVE ROUTE DATA
102

RECEIVE ENVIRONMENTAL DATA
106

INPUT AT LEAST ONE OF THE ROUTE DATA AND/OR THE ENVIRONMENTAL DATA INTO A MACHINE-LEARNED MODEL
110

RECEIVE ENERGY BUDGET DATA
112

CONTROL ONE OR MORE SETTINGS ASSOCIATED WITH A VEHICLE BASED AT LEAST IN PART ON THE ENERGY BUDGET DATA
114

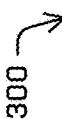

Environmental Data
and/or Route Data
304
- Solar Data
- Vehicle Speed
- Cabin Humidity Level
- ...

Computing System(s)
302

Thermal Control
System
306

Outputs 312
- Duct/HVAC Temp
- Airflow Rate
- ...

Outputs 314
- Breath/ Chest/
  Foot Temp
- Airflow Rate
- ...

HVAC Actuator(s)
308

Control Outputs
310
- Condenser
- Blow Speed
- Compressor
- Blower Speed
- EXV Position
- Heat/Cool
- Mode
- ...

Machine-Learned
Model
316

Outputs 318
- Estimated
  Breath/ Chest/
  Foot Temp
- Estimated
  Airflow Rate ...

Outputs 320
- Estimated Duck/
  HVAC Temp
- Estimated Airflow
  Rate...

Adjustment
Component
322

One or More Altered
Parameter(s) 324

One or More Altered
Parameter(s) 326

FIG. 3

600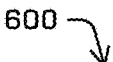

INPUT TRAINING DATA INTO A MACHINE-LEARNED MODEL, THE TRAINING DATA INCLUDE LOG DATA ANNOTATED WITH AN ACTUAL AMOUNT OF ENERGY CONSUMED DURING A TRIP, THE LOG DATA IS ASSOCIATED WITH A SET OF VARIABLES, THE MACHINE-LEARNED MODEL IS ASSOCIATED WITH A SET OF MODEL PARAMETERS FOR THE SET OF VARIABLES
602

RECEIVE, FROM THE MACHINE-LEARNED MODEL, ENERGY BUDGET DATA INDICATING A PREDICTED AMOUNT OF ENERGY
604

DIFFERENCES BETWEEN THE PREDICTED AMOUNT OF ENERGY AND THE ACTUAL AMOUNT OF ENERGY?
606

No

YES

OUTPUT A TRAINED MACHINE-LEARNED MODEL
608

ALTER ONE OR MORE MODEL PARAMETERS OF THE SET OF MODEL PARAMETERS TO MINIMIZE THE DIFFERENCES TO OBTAIN A TRAINED MACHINE-LEARNED MODEL
610

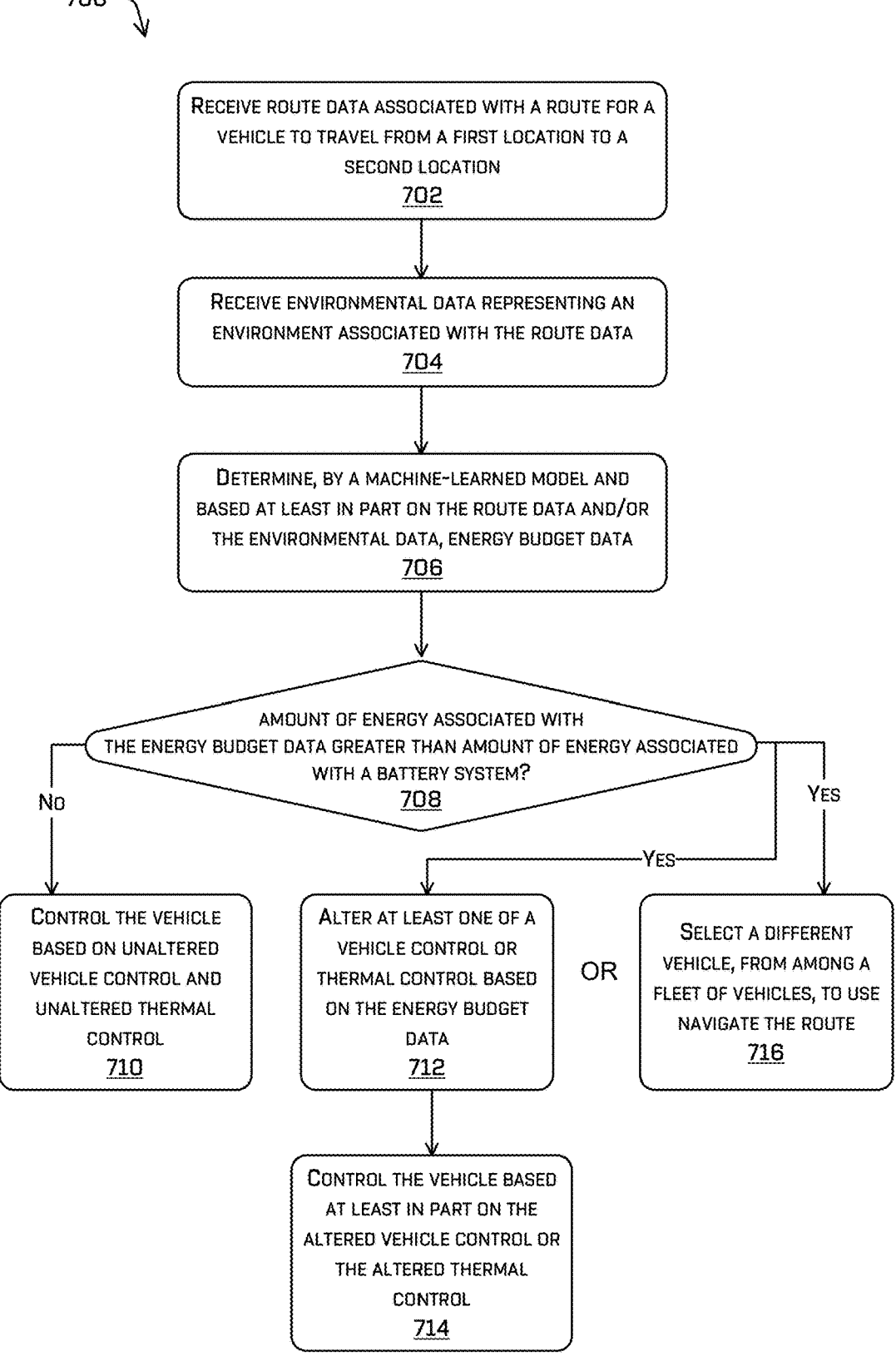

RECEIVE ROUTE DATA ASSOCIATED WITH A ROUTE FOR A VEHICLE TO TRAVEL FROM A FIRST LOCATION TO A SECOND LOCATION
702

RECEIVE ENVIRONMENTAL DATA REPRESENTING AN ENVIRONMENT ASSOCIATED WITH THE ROUTE DATA
704

DETERMINE, BY A MACHINE-LEARNED MODEL AND BASED AT LEAST IN PART ON THE ROUTE DATA AND/OR THE ENVIRONMENTAL DATA, ENERGY BUDGET DATA
706

AMOUNT OF ENERGY ASSOCIATED WITH THE ENERGY BUDGET DATA GREATER THAN AMOUNT OF ENERGY ASSOCIATED WITH A BATTERY SYSTEM?
708

NO

YES

YES

CONTROL THE VEHICLE BASED ON UNALTERED VEHICLE CONTROL AND UNALTERED THERMAL CONTROL
710

ALTER AT LEAST ONE OF A VEHICLE CONTROL OR THERMAL CONTROL BASED ON THE ENERGY BUDGET DATA
712

OR

SELECT A DIFFERENT VEHICLE, FROM AMONG A FLEET OF VEHICLES, TO USE NAVIGATE THE ROUTE
716

CONTROL THE VEHICLE BASED AT LEAST IN PART ON THE ALTERED VEHICLE CONTROL OR THE ALTERED THERMAL CONTROL
714

FIG. 7

VEHICLE THERMAL CONTROL SYSTEM

CROSS-REFERENCE TO RELATED APPLICATION

This application claims the benefit of priority to U.S. Provisional Application No. 63/232,764, filed Aug. 13, 2021, which is incorporated herein by reference and for all purposes.

BACKGROUND

Conventional vehicles may include heating, ventilation, and air conditioning (HVAC) systems that are used to control the temperature and/or humidity of a given area of the vehicle. These vehicle thermal control systems require energy to operate. Typical vehicles do not specifically account for the energy required to operate thermal control systems. Additionally, different users and/or operating conditions may influence an amount of energy that is required to operate the thermal control systems. However, conventional vehicles typically default to the last temperature and/or humidity settings that were active when the vehicle was turned off or otherwise may not be customized for a specific passenger and/or specific operating conditions.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 1 illustrates a pictorial flow diagram of an example process for determining energy budget data and controlling one or more setting(s) associated with a vehicle based at least in part on the energy budget data, in accordance with examples of the disclosure.

FIG. 3 illustrates an example architecture for implementing offline machine-learned model training processes for determining energy budget data, in accordance with examples of the disclosure.

FIG. 6 depicts an example process for training a machine-learned model to determine energy budget data, in accordance with examples of the disclosure.

FIG. 7 depicts an example process for controlling one or more setting(s) associated with a vehicle based on the energy budget data, in accordance with examples of the disclosure.

DETAILED DESCRIPTION

Figure 2:
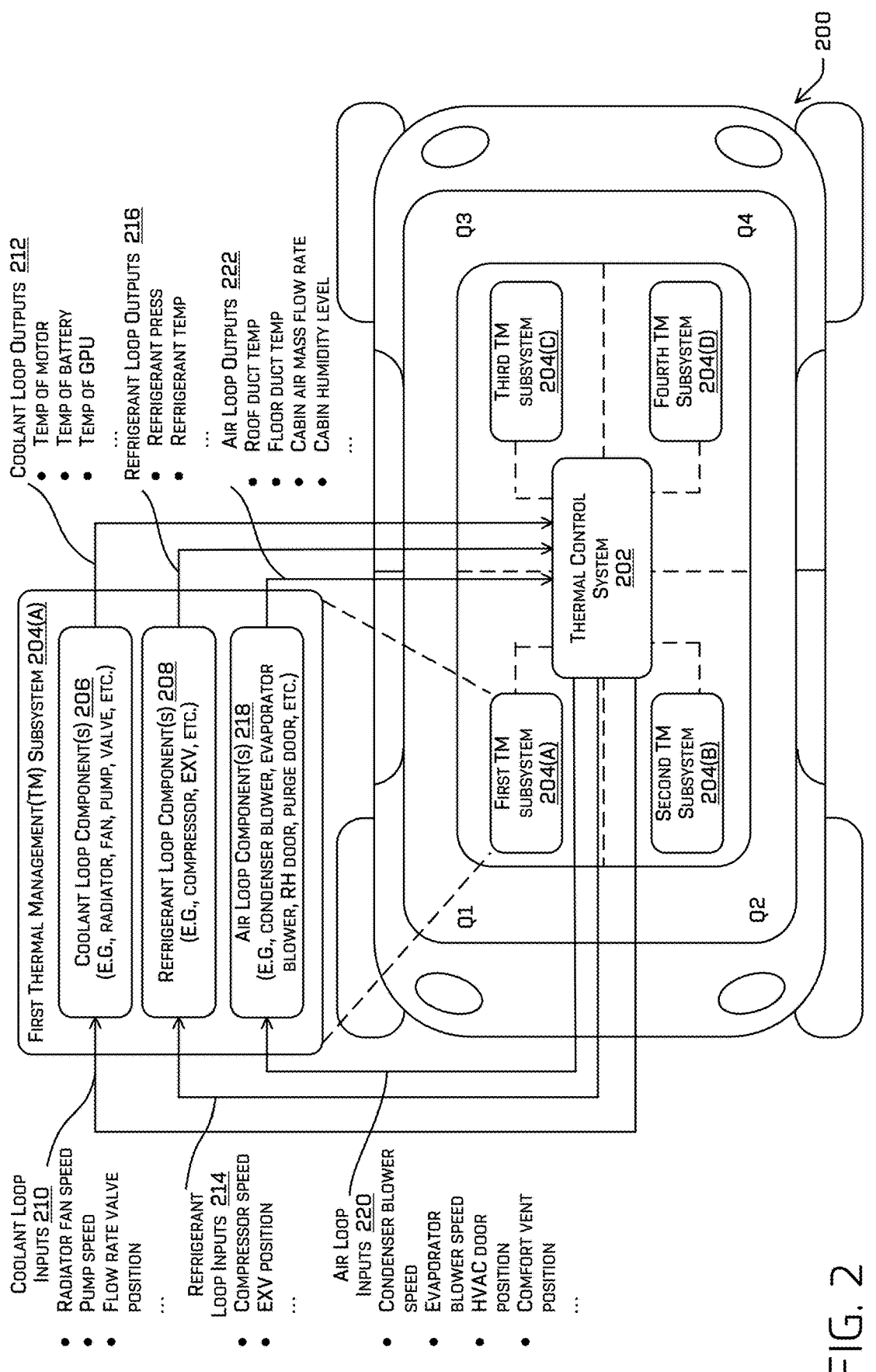
FIG. 2 illustrates an example vehicle including a thermal control system, the thermal control system includes one or more thermal management subsystem(s), in accordance with examples of the disclosure.

As discussed above, conventional vehicles typically do not account the energy required to operate thermal control systems (which may account for upwards of fifty percent of energy used by such a vehicle), nor do they customize operation of thermal control systems for a specific passenger, seating location, and/or specific operating conditions. Rather, a thermal control system in a conventional vehicle would typically default to the last temperature and/or humidity settings that were active when the vehicle was turned off. Defaulting to the last temperature and/or humidity settings does not take route data, environmental data, or other operational conditions into consideration. Conventional vehicle thermal control systems also are not customized for one or more specific passengers at specific seating location(s) in the vehicle. This application describes computing devices and techniques for estimating an energy budget for operating vehicle systems, including thermal management systems, during operation of the vehicle. In some examples, the techniques described herein may be customized based on particular origin and destination locations of the vehicle, a particular route the vehicle is to follow, one or more particular passengers to be transported during operation of the vehicle, environmental conditions (e.g., temperature, humidity, etc.), or other operating conditions of the vehicle. In some examples, the techniques described herein may be used to determine which vehicle, from among a fleet of multiple vehicles, to use to complete a trip. In some examples, the techniques described herein may be used to determine a route from among multiple available routes to use to navigate to a destination. In some examples, the techniques may include training a machine-learned model to determine energy budget data and/or dynamically adjust one or more setting(s) associated with a vehicle based at least in part on the energy budget data.

The settings associated with the vehicle can include one or more setting(s) associated with a propulsion system (e.g., motors, transmissions, gearboxes, etc.) of the vehicle, one or more setting(s) associated with a computing system (e.g., sensing systems, battery systems, etc.) of the vehicle, and/or one or more setting(s) associated with a thermal control system of the vehicle.

In some examples, a system can receive route data associated with a route for a vehicle to travel from a first location (e.g., an origin location) to a second location (e.g., a destination location). For example, the system can receive request data from a user device associated with a passenger, the request data indicative of a request from the passenger to book the vehicle. The system can determine, based on the request data, route data associated with transporting the passenger from the first location to the second location. In some cases, the route data can include one or more of a route distance, route velocity data, map data, estimated route compute level, current date and time associated with the route, requested pickup time, requested arrival time, or the like.

In some examples, the system can also receive environmental data representing an environment associated with the route data. In some cases, environmental data can include one or more of ambient environmental conditions associated with the route data, weather data (current and/or forecasted), solar load data, ambient temperature data, ambient air quality data, internal environmental conditions associated with the vehicle, internal temperature data, internal zone temperature data, internal air quality data, passenger profile data, passenger environment preference data, traffic data, or the like. In some examples, the passenger environment preference data can represent at least one of a preferred temperature, a preferred vent position, a preferred air speed, a preferred seating location within the vehicle, a preferred seat temperature, a preferred heating mode (e.g., heating provided via a seat heater, heating provided by a cabin air heater, etc.), a preferred window tinting setting (e.g., a window tint percentage, such as 20%, 30%, 50%, etc.), or the like. In some examples, the passenger environment preference data may be associated with a single passenger. In other examples, the passenger environment preference data may be associated with two or more passengers. For example, the environmental data can include first passenger environment preference data associated with a first passenger and second passenger environment preference data associated with a second passenger.

The system can determine, based at least in part on the route data and/or the environment data, energy budget data. In some examples, a machine-learned model can be used to determine the energy budget data. The energy budget data can include an estimated amount of the energy associated with following a particular route and/or associated with particular environmental conditions. In some examples, determining the energy budget data includes determining an estimated amount of energy needed to control at least one of the propulsion system (e.g., motor, transmission, gearbox, etc.) of the vehicle, the computing system of the vehicle, or the thermal control system of the vehicle from the first location to the second location. For example, the energy budget data can take into account cooling of one or more component(s) (e.g., the propulsion system, the computing system, one or more thermal management subsystem(s)) of the vehicle while navigating from the first location to the second location.

In some examples, a state of the vehicle or an expected state of the vehicle due to environmental, route, and/or time condition(s) can be used to determine the energy budget. This can include characterizing one or more components of the vehicle using one or more sensors associated with the vehicle.

By way of example and without limitation, the energy budget data can be determined based at least in part on a distance of a route, ambient temperature, preferences of users in the vehicle, map data, or the like. For example, a vehicle may be configured with multiple seating locations disposed in different quadrants or zones of the vehicle. Thermal conditions at the various seating locations or zones may be customized based on individual passengers' preferences. Accordingly, for a given route, energy budgets can vary depending on the personal preferences of passengers and/or based on ambient air temperatures. For example, for a given route and a given passenger thermal preference, an energy budget may vary depending on the ambient temperature, solar exposure, etc., along the route. In some examples, the map data that can be used to determine an amount of energy needed because of topology (e.g., hills, shaded regions, exposed regions, etc.), traffic lights and signs, and other objects and conditions in the environment. For instance, more energy may be needed by the drive train of a vehicle to gain elevation up a hill, energy may be recaptured by a regenerative braking system of the vehicle as it descends a hill, more energy may be needed for a thermal control system of the vehicle in a sun-exposed region than in a shaded region, more energy may be need to be budgeted for a route that includes multiple stoplights or stop signs at which the vehicle may be required to stop while maintaining cabin control temperatures, etc. Of course, these are but provided examples, and the disclosed techniques are not limited to these provided examples.

In some examples, the machine-learned model can be trained using log data. For example, the system can input training data into a machine-learned model configured to determine energy budget data for a trip, where the training data includes previously recorded and stored log data annotated with actual energy consumption. In some examples, the actual energy consumption(s) associated with one or more system(s) (e.g., a thermal control system, a propulsion system, a sensor system, etc.) of a vehicle can be tracked using various sensor(s) or monitors associated with the individual systems. For example, the actual energy consumption(s) associated with the system(s) can be determined based at least in part on current data and voltage data associated with the system(s). As one example, an electricity measurement sensors (e.g., current and/or voltage monitors) may be electrically coupled to measure electricity consumed by the overall thermal control system and/or individual components thereof (e.g., vent fans, pumps, compressors, valves, etc.), to measure the electricity consumption of the various components, and electricity consumption data collected by these measurement sensors can be timestamped, associated with operation of the vehicle during the routes, and stored in association with the log data. In other examples, the actual energy consumed by various systems may be determine by using data disaggregation techniques to discern the amount of energy used by various systems from an aggregate energy consumption measurement. The log data can be associated with a set of variables, and the machine-learned model can be associated with a set of model parameters for the set of variables. Example variables associated with the log data can include, but are not limited to start location, end location, route distance, vehicle velocities, thermal temperature, airflow rate, refrigerant temperature, airflow rate, compressor speed, or the like overtime during the course of individual trips. The system can then receive, from the machine-learned model, the energy budget data representing a predicted amount of energy required to complete the trip. The energy budget data can take into account an estimated amount of energy needed to control a temperature of various components of the vehicle (e.g., propulsion system, battery system, sensing system, etc.), including a thermal control system of the vehicle, during the trip. The system can determine a difference between the predicted amount of energy required to complete the trip (e.g., navigate the vehicle from the first location to the second location) and the actual energy consumption. The system can further update the machine-learned model based at least in part on the actual energy consumption used to navigate the vehicle from the first location to the second location. For example, the system can update one or more model parameter(s) of the set of model parameters to minimize the difference and to obtain a trained machined-learned model.

In some examples, the system can receive battery charge state data associated with a plurality of battery systems associated with a plurality of vehicles. The system can determine, based at least in part on the energy budget and the battery charge state data, the vehicle of the plurality of vehicles to dispatch for the route and deploy the vehicle based on the route data.

In some examples, the system can further control at least one of the propulsion systems (e.g., motors, transmissions, gearboxes, etc.) of the vehicle, the computing systems (e.g., sensing systems, battery system, etc.) of the vehicle, or the thermal control systems of the vehicle based at least in part on the energy budget data. For example, the system can receive battery charge state data associated with a battery system of the vehicle and determine, based on the battery charge state data, that a first amount of power associated with the energy budget data is greater than a second amount of power associated with the battery charge state data. Based on determining the first amount of power is greater than the second amount of power, the system can alter at least one of one or more setting(s) associated with the propulsion system of the vehicle, one or more setting(s) associated with the computing system of the vehicle, and/or one or more setting(s) associated with the thermal control system of the vehicle.

In an example directed to altering the settings associated with the propulsion systems of the vehicle, possible modifications of the settings may include, but are not limited to, altering one or more of a route associated with the vehicle, a velocity associated with the vehicle, or the like. For example, the system can plan a new route and/or adjust a planned speed to stay within the first amount of power associated with the energy budget data.

In an example directed to altering the settings associated with the computing system of the vehicle, possible modifications of the settings may include, but are not limited to, altering one or more of a number of sensors to use, a sensing range, a level of compute to use, or the like. For example, the system can reduce the number of sensors to use and/or adjust the sensing range to stay within the first amount of power associated with the energy budget data.

In an example directed to altering the settings associated with the thermal control system of the vehicle, possible modifications of the settings may include, but are not limited to, altering one or more of a blower control, a compressor control, a vent position control, a heating mode, a cooling mode, or the like. For example, the system can adjust a planned temperature and/or change a planned airflow rate to stay within the first amount of power associated with the energy budget data.

The systems and methods described herein can improve a functioning of a computing device in a number of ways. In some examples, by training a machine-learned model, techniques described herein can intelligently predict amount of energy required to complete a trip based on route data and/or environmental data associated with the trip. The predicted amount of energy can be used by a thermal control system or computing system of a vehicle to balance energy, comfort, progress to a destination, while maintaining passenger safety. For example, the vehicle system can alter one or more setting(s) associated with a propulsion system, a computing system, and/or a thermal control system of the vehicle based on determining the amount of energy required to complete the trip is less than an amount of energy associated with a battery system of the vehicle. The techniques may also be used to deploy a vehicle that can most efficiently service a particular trip request and/or to adjust operation of a vehicle to more efficiently service the trip request. Accordingly, the techniques described herein enable the use of more sophisticated computational resources to improve functioning and performance of the computer system. These and other improvements to the functioning of the computer are discussed herein.

The methods, apparatuses, and systems described herein can be implemented in a number of ways. Example implementations are provided below with reference to the following figures. Although discussed in the context of a vehicle (e.g., an autonomous vehicle, a manually driven vehicle, etc.), the methods, apparatuses, and systems described herein can be applied to a variety of systems (e.g., a robotic platform, a water-based craft, a spacecraft, etc.), and are not limited to vehicles. In some examples, the techniques discussed herein can be used to control or model physical objects or virtual objects (e.g., in a simulation). In one example, similar techniques may be utilized in an air-based craft (e.g., an airplane, a helicopter, a drone, etc.), such as a system may provide an indication of an estimated amount of power for requested operations and whether there is enough amount of power to perform the requested operations. In other examples, the methods, apparatuses, and systems may be utilized to provide modifications to the requested operations.

FIG. 1 illustrates a pictorial flow diagram of an example process 100 for determining energy budget data and controlling one or more setting(s) associated with a vehicle based at least in part on the energy budget data, in accordance with examples of the disclosure.

At operation 102, the process 100 can include receiving route data 104. For example, a passenger associated with a computing device can provide request data to a system, the request data indicative of a request from the passenger to book a vehicle. The system can determine, based on the request data, the route data 104 associated with transporting the passenger from a first location to a second location. In some examples, the route data 104 can include one or more of a start location associated with a route, an end location associated with the route, a distance associated with the route, an average velocity associated with the route, map data determined based on the route, elevation data associated with the route, estimated route compute level, current date and time associated with the route, requested pickup time, requested arrival time, etc.

At operation 106, the process 100 can include receiving environmental data 108. In some examples, the environmental data 108 can be determined based at least in part on the route data 104. For example, the system can retrieve ambient temperature based on the first location and/or the second location. In some examples, the environmental data 108 can include, but are not limited to, one or more of ambient environmental conditions associated with the route data (e.g., weather, temperature, air quality, etc. along the route), weather data, solar load data, ambient temperature data, ambient air quality data, internal environmental conditions associated with the vehicle, internal temperature data, internal zone temperature data, internal air quality data, passenger profile data (e.g., passenger data, passenger age, passenger gender, etc.), passenger environment preference data, traffic data, or the like.

In some examples, the passenger environment preference data included in the environmental data 108 can represent at least one of a preferred temperature, a preferred vent position (e.g., head, chest, foot, etc.), a preferred air speed (e.g., low, medium, high, etc.), a preferred seat, a preferred seat temperature, a preferred heating mode, a preferred tinting setting, or the like. In some examples, the passenger environment preference data can be associated with a single passenger. For example, the system may receive request data from a user device indicating a particular passenger is associated with a trip, and the request data may include passenger environment preference data associated with the particular passenger. In some examples, the passenger environment preference data may be associated with two or more passengers. For example, the system may receive request data from the user device indicating a first passenger and a second passenger are associated with the trip, and the request data may include first passenger environment preference data associated with the first passenger and second passenger environment preference data associated with the second passenger. Additionally, in some examples, the system can determine the passenger environment preference data based on log data. In some examples, passenger preference data may be stored in association with user profiles of the individual users based on explicitly set preferences, based on historical settings made by the user during previous rides, etc. Further, the passenger environment preference data may be updated over time based on user settings during subsequent rides. For example, the system can input log data into a machine-learned model trained to determine passenger environment preference data. In some examples, the machine-learned model may be trained to take into account each passenger's preferences individually and to attempt to optimize settings for all passengers. In other examples, the machine-learned model may be trained to budget for and control temperature settings that compromise between conflicting passenger preferences (e.g., if multiple passengers have widely diverging or extreme temperature preferences, the machine learned model may moderate one or both passenger preferences to improve efficiency of operation of the thermal system). In examples, a machine-learned model as disclosed herein can account for combinations of user settings and thermal control system setting correlations between users (e.g., one user's settings in a zone may influence an adjacent zone based on an additional user's settings). In other words, energy usage of one zone of a thermal control system may be influenced by other zones in the system. Examples of machine-learned models trained to determine passenger environment preference data are discussed below in connection with FIG. 5.

At operation 110, the process 100 can include inputting at least one of the route data 104 or the environmental data 108 into a machine-learned model trained to determine energy budget data. The energy budget data can indicate an estimated amount of the energy associated with following a route and/or associated with particular environmental conditions. For example, the machine-learned model can determine the energy budget data based at least in part on the route data 104, such as route data indicative of a distance of the route and preferred temperatures associated with passengers in the vehicle. For example, the vehicle may be configured with multiple quadrants or zones that allow users to customize thermal conditions for individual preferences. Example of a vehicle configured with multiple zones is discussed below in connection with FIG. 2. As another example, the machine-learned model can determine the energy budget data based at least in part on current day of year or current time of day. For example, based on current day of year, the machine-learned model can determine the current day of year is associated with a particular season (e.g., a summer season, a spring season, a fall season, a winter season, a flu season, etc.) The machine-learned model can further update one or more model parameter(s) based at least in part on the particular season. By updating the model parameter(s) based at least in part on the particular season, the machine-learned model can take weather condition(s) and/or traffic condition(s) associated with the particular season into consideration and can determine the energy budget data based at least in part on the current day of year. Similarly, the machine-learned model can further update one or more model parameter(s) based at least in part on current time of day. By updating the model parameter(s) based at least in part on the current time of day, the machine-learned model can take weather condition(s) associated with the current time of day into consideration and can determine the energy budget data based at least in part on the current time of day.

As another example, the machine-learned model can determine the energy budget data based at least in part on the environmental data 108, such as external environmental data, solar load data, internal environmental data, and/or passenger-related data. Passenger-related data can include passenger data, passenger age, passenger gender, and/or passenger environment preference data. In some examples, the environmental data 108 can include passenger environment preference data, which can indicate a preferred temperature and/or a preferred air speed. The machine-learned model can determine the energy budget data based at least in part on the preferred temperature and/or preferred air speed. As another example, the environmental data 108 can include passenger data (e.g., data related to previous trips), passenger age, and/or passenger gender. The machine-learned model can determine a recommended temperature based on the passenger data, the passenger age, and/or the passenger gender and further determine the energy budget data based on the recommended temperature. An example of a machined-learned model configured to offer a recommended temperature is discussed below in connection with FIG. 5.

In some examples, the environmental data 108 can include external environmental data. External environmental data can include, but are not limited to, ambient environmental conditions associated with the route data 104, weather data, ambient temperature data, ambient air quality data, ambient humidity level, traffic data, etc. By determining the energy budget data based in part on the external environment data, the machine-learned model can take external environment conditions into consideration when determining an amount of power required to navigate a vehicle from a first location to a second location.

In some examples, the environmental data 108 can include solar load data. Solar load data can include, but are not limited to, sunlight level, a direction of sun incidence (e.g., for example, location of the sun relative to the vehicle), etc. By determining the energy budget data based in part on the solar load data, the machine-learned model can take solar radiation into consideration when determining the amount of power required for the vehicle to complete a trip.

In some examples, the environmental data 108 can include internal environmental data. Internal environmental data can include, but are not limited to, internal environment conditions associated with the vehicle, internal temperature data, internal zone temperature data, internal air quality data, etc. By determining the energy budget data based in part on the internal environmental data, the machine-learned model can take internal environment conditions into consideration when determining the amount of power required for the vehicle to complete the trip.

In some examples, determining the energy budget data can include determining an estimated amount of energy needed to control at least one of a propulsion system of the vehicle, a computing system of the vehicle, or a thermal control system of the vehicle from the first location to the second location. For example, the energy budget data can take into account a route distance and/or a planned speed of the vehicle while navigating from the first location to the second location. As another example, the energy budget data can take into account a number of sensors to use for a computing system (e.g., a sensing system) of the vehicle. As another example, the energy budget data can take into account temperatures of one or more component(s) (e.g., one or more thermal management subsystem(s)) of the vehicle while navigating from the first location to the second location.

In some examples, where multiple passengers are traveling in a vehicle, energy budget data associated with the vehicle (including energy budgets associated with one or more vehicle systems, such as energy budget associated with a propulsion system, a sensor system, a thermal control system, etc.) can be based on environmental data associated with each passenger. For example, the environmental data can comprise first passenger environment preference data associated with a first passenger and second passenger environment preference data associated with a second passenger. Further, techniques can include determining the energy budget data associated with a particular trip based at least in part on the first passenger environment preference data and the second passenger preference data. For example, a vehicle having a first passenger that likes a relatively hot temperature or thermal setting (e.g., associated with their particular quadrant) and a second passenger that likes a relatively cool temperature or thermal setting may have an energy budget associated with a thermal control system that is different than another vehicle having two passengers that prefer the same neutral thermal setting.

At operation 112, the process 100 can include receiving the energy budget data. In some examples, the machine-learned model trained to determine energy budget data can be included in an in-vehicle computing system running on a vehicle and be trained online. For example, the machine-learned model can be trained to determine the energy budget data based on various known conditions (e.g., a planned route, traffic map, weather forecast, GPS info, air quality forecast, etc.) prior to vehicle departure. While the machine-learned model is running on the vehicle, the machine-learned model can be further updated using online training. For example, the machine-learned can learn to account for variations in the environment (e.g., effect of potholes in the road, effect of shade from buildings, trees, or other objects in the environment, etc.) that could not plausibly be trained prior to vehicle deployment. Alternatively, in some examples, the machine-learned model can be included in a remote computing system and be trained offline. Additional details of the machine-learned model are provided below in connection with FIG. 3 and FIG. 4.

At operation 114, the process 100 can include controlling one or more setting(s) 116 associated with the vehicle based at least in part on the energy budget data. The settings 116 associated with the vehicle can include one or more setting (s) associated with a propulsion system of the vehicle (e.g., a motor, a transmission, a gearbox, etc.), one or more setting(s) associated with a computing system of the vehicle (e.g., a sensing system, a battery system, etc.), and/or one or more setting(s) associated with a thermal control system of the vehicle. For example, the system can receive battery charge state data associated with a battery system of the vehicle and determine, based on the battery charge state data, that a first amount of power associated with the energy budget data is greater than a second amount of power associated with the battery charge state data. Based on determining the first amount of power is greater than the second amount of power, the system can alter at least one of the settings associated with the vehicle. An example of determining battery charge state data associated with a battery system in a vehicle is described in U.S. patent application Ser. No. 16/104,310 titled "Redundant Battery Management System Architecture" and filed Aug. 17, 2018, the entirety of which is herein incorporated by reference in its entirety for all purposes.

In an example directed to altering the settings associated with the propulsion system of the vehicle, possible modifications of the settings may include, but are not limited to, altering one or more of a route associated with the vehicle, a velocity associated with the vehicle, or the like. For example, the system can plan a new route and/or adjust a planned speed to stay within the first amount of power associated with the energy budget data.

In an example directed to altering the settings associated with the computing system of the vehicle, possible modifications of the settings may include, but are not limited to, altering one or more of a number of sensors to use, a sensing range, a level of compute to use, or the like. For example, the system can reduce the number of sensors to use and/or adjust the sensing range to stay within the first amount of power associated with the energy budget data.

In an example directed to altering the settings associated with the thermal control system of the vehicle, possible modifications of the settings may include, but are not limited to, altering one or more of a blower control, a compressor control, a vent position control, a heating mode, a cooling mode, or the like. For example, the system can adjust a planned temperature and/or change a planned airflow rate to stay within the first amount of power associated with the energy budget data.

In some examples, the system can receive battery charge state data associated with a plurality of battery systems associated with a plurality of vehicles. The system can determine, based at least in part on the energy budget and the battery charge state data, the vehicle of the plurality of vehicles to dispatch for the route and deploy the vehicle based on the route data.

As described herein, an exemplary machine-learned model can utilize a neural network that passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning can be used consistent with this disclosure. For example, machine learning techniques can include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), Ada-Boost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, or the like.

In some examples, in addition to or instead of a machine-learned model, techniques can include using a data structure, such as a look-up table, to determine energy budget data. Such a look-up table can include multiple dimensions, and various factors can be used to refine energy budget estimates. For example, a first level look-up can be a trip distance, followed by a passenger thermal setting, followed by other factors, to determine energy budget data. Of course, more or fewer factors can be considered in accordance with the techniques discussed herein.

FIG. 2 illustrates an example autonomous vehicle 200 including an example thermal control system 202. The thermal control system 202 includes one or more thermal management (TM) subsystem(s) 204(A)-204(D) (collectively, the TM subsystems 204), in accordance with examples of the disclosure.

The autonomous vehicle 200 may be configured to operate according to a Level 6 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 200 may be a fully or partially autonomous vehicle having any other level or classification. Moreover, in some examples, the heat load balancing techniques described herein may be usable by non-autonomous vehicles as well.

The autonomous vehicle 200 of FIG. 2 can include quadrants Q1, Q2, Q3, and Q4 (collectively, the quadrants) that can independently provide heating or cooling according to passenger preferences. Thus, temperature and/or airflow rate of each of the quadrants Q1 and Q2 may be controlled by respective first thermal management subsystem 204(A) and second thermal management subsystem 204(B) located in quadrant portions Q1 and Q2, and the temperature of each of the quadrants Q3 and Q4 may be respective third thermal management subsystem 204(C) and fourth thermal management subsystem 204(D) located in quadrant portions Q3 and Q4. In some examples, each quadrant portion may be provided with a respective temperature and/or respective airflow rate. For example, a first vehicle seat located in quadrant portions Q1 may be associated with a first temperature, and a second vehicle seat located in quadrant portions Q2 may be associated with a second temperature. In some examples, an example of a thermal control system with zone control (such as the thermal control system 202) can be implemented in a vehicle as described in U.S. patent application Ser. No. 16/017,424 titled "Heating Ventilation And Air Conditioning (HVAC) System With Zonal Control" and filed Jun. 25, 2018, the entirety of which is herein incorporated by reference in its entirety for all purposes.

Each of the TM subsystems 204 can include one or more coolant loop component(s) and/or one or more refrigerant loop component(s). As illustrated in FIG. 2, the first thermal management subsystem 204(A) includes coolant loop component(s) 206, refrigerant loop component(s) 208, and air loop component(s) 218.

The coolant loop component(s) 206 can be configured to regulate the temperatures of one or more vehicle component(s) of the autonomous vehicle 200, such as the motor, battery, GPU, and/or CPU, to ensure the vehicle component(s) can operate at a healthy level without degrading performance. Example coolant loop component(s) 206 can include, but are not limited to, radiator(s), radiator fan(s), pump(s), valve(s), etc. In some examples, the coolant loop component(s) 206 can receive coolant loop inputs 210 from the thermal control system 202 and control the coolant loop component(s) 206 based on the coolant loop inputs 210. Example coolant loop inputs 210 can include, but are not limited to, radiator fan speeds, multiple pump speeds, flow rate valve position, a coolant route valve position, etc. In some examples, the coolant loop component(s) 206 can output coolant loop outputs 212 to the thermal control system 202, and the thermal control system 202 can determine energy budget data based at least in part on the coolant loop outputs 212. Example coolant loop outputs 212 can include, but are not limited to, temperature of a motor, temperature of a battery, temperature of GPU, temperature of CPU, etc.

The refrigerant loop component(s) 208 can be associated with the coolant loop component(s) 208 to regulate the conditions associated with the vehicle component(s) of the vehicle 200. Example refrigerant loop component(s) 208 can include, but are not limited to, compressor, electronic expansion valve (EXV), etc. In some examples, the refrigerant loop component(s) 208 can receive refrigerant loop inputs 214 from the thermal control system 202 and control the refrigerant loop component(s) 208 based on the refrigerant loop inputs 214. Example refrigerant loop inputs 210 can include, but are not limited to, compressor speed, EXV position, etc. In some examples, the refrigerant loop component(s) 208 can output refrigerant loop outputs 216 to the thermal control system 202, and the thermal control system 202 can determine energy budget data based at least in part on the refrigerant loop outputs 216. Example refrigerant loop outputs 216 can include, but are not limited to, refrigerant pressure, refrigerant temperature, etc.

The air loop component(s) 218 can be configured to regulate conditions associated with a vehicle cabin of the autonomous vehicle 200, such as a breath level temperature associated with a seat, a chest level temperature associated with the seat, a foot level temperature associated with the seat, an airflow rate associated with the seat, etc. Example air loop component(s) 218 can include, but are not limited to, condenser blower, evaporator blower, RH door, purge door, etc. In some examples, the air loop component(s) 218 can receive air loop inputs 220 from the thermal control system 202 and control the air loop component(s) 218 based on the air loop inputs 220. Example air loop inputs 220 can include, but are not limited to, condenser blower speed, evaporator blower speed, reheat door position, purge door position, HVAC door position, comport vent position, etc. In some examples, the air loop component(s) 218 can output air loop outputs 222 to the thermal control system 202, and the thermal control system 202 can determine energy budget data based at least in part on the air loop outputs 222. Example air loop outputs 222 can include, but are not limited to, HVAC discharge temperature, HVAC discharge airflow rate, breath level temperature, chest level temperature, foot level temperature, roof duct temperature, floor duct temperature, cabin air mass flow rate, cabin humidity level, etc. Additional details of a thermal control system may be found in U.S. patent application Ser. No. 16/691,521, titled "Vehicle Computer Cooling Architecture" and filed Nov. 21, 2019, the entirety of which is herein incorporated by reference in its entirety for all purposes.

FIG. 3 illustrates an example architecture for implementing an offline machine-learned model training processes for determining energy budget data, in accordance with examples of the disclosure.

In some examples, one or more computing system(s) 302 can provide environmental data and/or route data 304 to a thermal control system 306. The environmental data and/or route data 304 can include route data indicative of one or more of a start location associated with a route, an end location associated with the route, a distance associated with the route, an average velocity associated with the route, map data determined based on the route, elevation data associated with the route, estimated route compute level, current date and time associated with the route, requested pickup time, requested arrival time, etc. The environmental data and/or route data 304 can further include environmental data indicative of one or more of ambient environmental conditions associated with the route data (e.g., weather, temperature, air quality, etc. along the route, etc.), weather data, solar load data, ambient temperature data, ambient air quality data, internal environmental conditions associated with the vehicle, internal temperature data, internal zone temperature data, internal air quality data, passenger profile data (e.g., passenger data, passenger age, passenger gender, etc.), traffic data, etc.

In some examples, one or more HVAC actuator(s) 308 (e.g., coolant loop component(s) 206, refrigerant loop component(s) 208, and/or air loop component(s) 218 as illustrated in FIG. 2) can provide control outputs 310 to the thermal control system 306. In some examples, the control outputs 310 can include one or more current settings associated with the HVAC actuator(s) 308, such as radiator fan speed, multiple pump speeds, flow rate valve position, a coolant route valve position, compressor speed, condenser blower speed, evaporator blower speed, electronic expansion valve (EXV) position, reheat door position, purge door position, etc. The thermal control system 306 can determine, based at least in part on the control outputs 310 and the environmental data and/or route data 304, one or more outputs 312 and/or one or more outputs 314. In some examples, the outputs 312 can include, but are not limited to, duct/HVAC temperature, airflow rate, etc. In some examples, the outputs 314 can include, but are not limited to, breath level temperature, chest level temperature, foot level temperature, airflow rate, etc.

In some examples, the environmental data and/or route data 304 and the control outputs 310 can be provided to a machine-learned model 316 trained to determine energy budget data. In some examples, the machine-learned model 316 can be trained using log data. For example, a system can input training data into the machine-learned model 316 configured to determine energy budget data for a trip, where the training data includes the log data annotated with actual energy consumption. The log data can be associated with a set of variables, and the machine-learned model can be associated with a set of model parameters for the set of variables. Example variables associated with the log data can include, but are not limited to start location, end location, route distance, vehicle velocities, HVAC temperature, airflow rate, refrigerant temperature, airflow rate, compressor speed, or the like. The system can then receive, from the machine-learned model, the energy budget data representing a predicted amount of energy required to complete the trip. The energy budget data can take into account an estimated amount of energy needed to control a temperature of a thermal control system during the trip. The system can determine a difference between the predicted amount of energy required to complete the trip and the actual energy consumption. The system can further update the machine-learned model 316 based at least in part on the actual energy consumption used to complete the trip. For example, the system can update one or more model parameter(s) of the set of model parameters associated with the machine-learned model 316 to minimize the difference and to obtain a trained machined-learned model.

In some examples, the energy budget data include an estimated amount of energy needed to control the thermal control system of the vehicle during a trip. For example, the machine-learned model 316 can determine the energy budget data indicating an amount of energy needed to control the thermal control system of the vehicle during a trip based on outputs 318. The outputs 318 can include, but are not limited to, one or more of estimated breath level temperature, estimated chest level temperature, estimated foot level temperature, estimated airflow rate, etc.

In some examples, the energy budget data include an estimated amount of energy needed to control one or more vehicle component(s) of a vehicle to ensure the vehicle component(s) can operate at a healthy level without degrading performance. For example, the machine-learned model 316 can determine the energy budget data indicating an amount of energy needed to control one or more vehicle component(s) of the vehicle to ensure the vehicle component(s) can operate at a healthy level without degrading performance based on outputs 320. The outputs 320 can include, but are not limited to, one or more of estimated duck/HVAC temperature, estimated airflow rate, etc.

In some examples, the outputs 312 can be combined with the outputs 320 and be inputted into a setting adjustment component 322. Alternatively, the outputs 312 and the outputs 320 can be separately inputted into the adjustment component 322. The adjustment component 322 can determine a difference between the outputs 312 and the outputs 320 and can alter one or more parameter(s) 324 associated with the machine-learned model 316 to minimize the difference to obtain a trained machine-learned model.

In some examples, the outputs 314 can be combined with the outputs 318 and be inputted into the adjustment component 322. Alternatively, the outputs 314 and the outputs 318 can be separately inputted into the adjustment component 322. The adjustment component 322 can determine a difference between the outputs 314 and the outputs 318 and can update one or more model parameter(s) 326 associated with the machine-learned model 316 to minimize the difference to obtain a trained machine-learned model.

Figure 4:
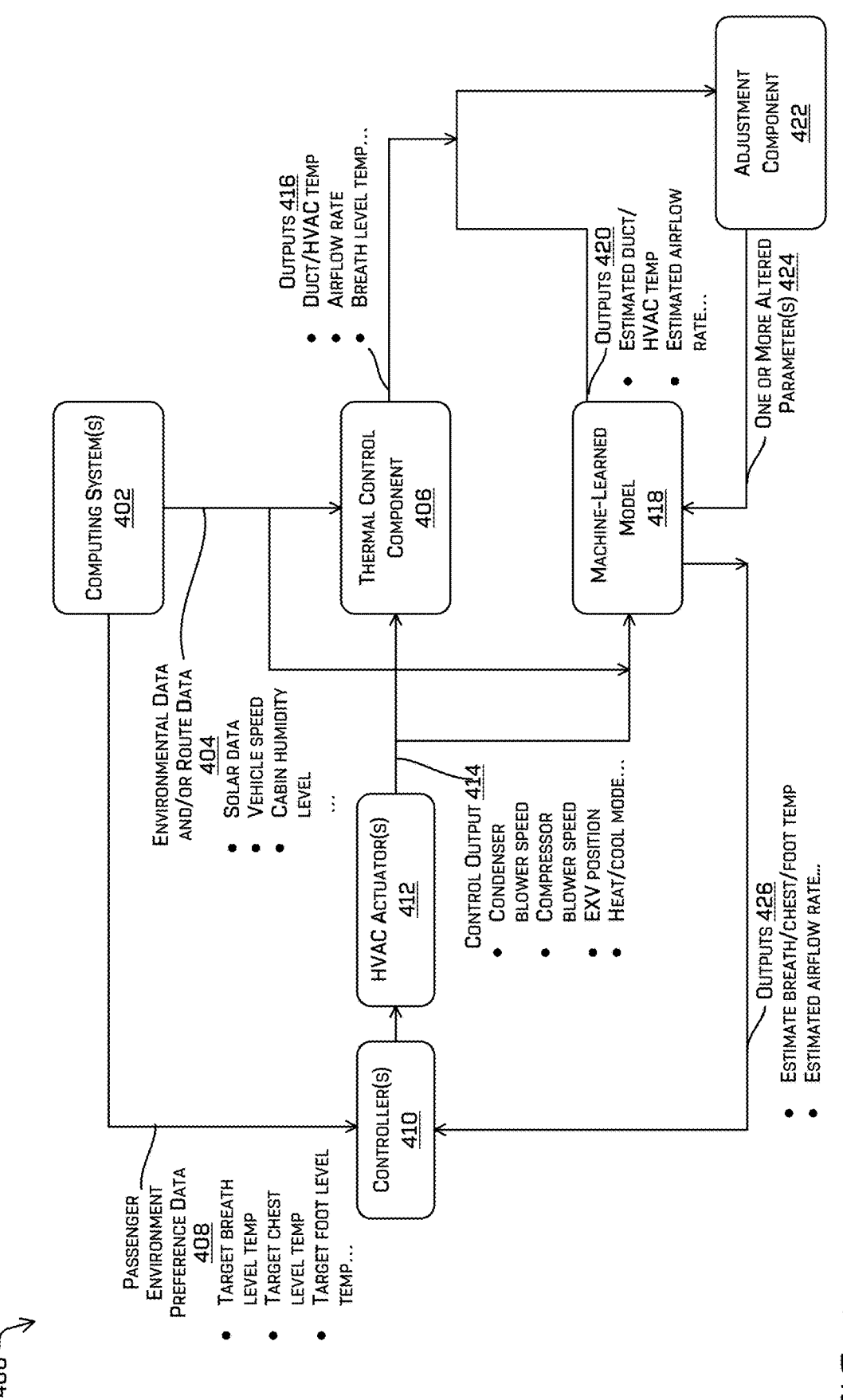
FIG. 4 illustrates an example architecture for implementing online machine-learned model training processes for determining energy budget data, in accordance with examples of the disclosure.

FIG. 4 illustrates an example architecture for implementing an online machine-learned model training processes for determining energy budget data and controlling one or more setting(s) associated with a vehicle based on the energy budget data, in accordance with examples of the disclosure.

In some examples, one or more computing system(s) 402 can provide environmental data and/or route data 404 to a thermal control system 406. The environmental data and/or route data 404 can include route data indicative of one or more of a start location associated with a route, an end location associated with the route, a distance associated with the route, an average velocity associated with the route, map data determined based on the route, elevation data associated with the route, estimated route compute level, current date and time associated with the route, requested pickup time, requested arrival time, etc. The environmental data and/or route data 404 can further include environmental data indicative of one or more of ambient environmental conditions associated with the route data (e.g., weather, temperature, air quality, etc. along the route, etc.), weather data, solar load data, ambient temperature data, ambient air quality data, internal environmental conditions associated with the vehicle, internal temperature data, internal zone temperature data, internal air quality data, passenger profile data (e.g., passenger data, passenger age, passenger gender, etc.), traffic data, etc.

In some examples, the computing system(s) 402 can further provide passenger environment preference data 408 to one or more controller(s) associated with a vehicle. The passenger environment preference data 408 can include, but are not limited to, a target breath level temperature, a target chest level temperature, a target foot level temperature, etc. Controller(s) 410 can provide the passenger environment preference data 408 to one or more HVAC actuator(s) 412 (e.g., coolant loop component(s) 206, refrigerant loop component(s) 208, and/or air loop component(s) 218 as illustrated in FIG. 2) and control one or more component of the HVAC actuator(s) 412 based on the passenger environment preference data 408.

In some examples, the HVAC actuator(s) 412 can provide control outputs 414 to the thermal control system 406. In some examples, the control outputs 414 can include one or more of radiator fan speed, multiple pump speeds, flow rate valve position, a coolant route valve position, compressor speed, condenser blower speed, evaporator blower speed, reheat door position, purge door position, etc. The thermal control system 406 can determine, based at least in part on the control outputs 414 and the environmental data and/or route data 404, one or more outputs 416. In some examples, the outputs 416 can include, but are not limited to, duct/ HVAC temperature, airflow rate, etc. In some examples, the outputs 416 can be estimated online and adaptively to minimize phase delay associated with feedback signals. Furthermore, this type of design can allow the controller(s) 410 to pre-act on typical process systems with large time delay and ensure accurate control.

In some examples, the environmental data and/or route data 404 and the control outputs 414 can be provided to a machine-learned model 418 trained to determine energy budget data. The machine-learned model 418 can be trained using training data. For example, the training data can include one or more of power consumption for predefined conditions, such as route data, compute stress (e.g., a level of complexity based on environmental conditions such as numbers of pedestrians or objects, vehicles, complex intersections, or the like), time of day, day of year, vehicle velocity (e.g., a various point(s) along the route), travel distance (e.g., to pick up a passenger, distance traveled with a passenger, distance to other waypoints, etc.), environment air quality (e.g., ambient air temperature, air quality data, etc.).

The training data can be associated with known power consumption profiles (e.g., ground truth) indicating instantaneous or aggregated power usage over time based on operating conditions. Accordingly, the machine-learned model 418 can be trained to output or determine energy budget data for given input data.

In some examples, the energy budget data include an estimated amount of energy needed to control one or more vehicle component(s) of a vehicle to ensure the vehicle component(s) can operate at a healthy level without degrading performance. For example, the machine-learned model 418 can determine the energy budget data indicating an amount of energy needed to control one or more vehicle component(s) of the vehicle to ensure the vehicle component(s) can operate at a healthy level without degrading performance based on outputs 420. The outputs 420 can include, but are not limited to, one or more of estimated duct/HVAC temperature, estimated airflow rate, etc.

In some examples, the outputs 416 can be combined with the outputs 420 and be inputted into the adjustment component 422. Alternatively, the outputs 416 and the outputs 420 can be separately inputted into the adjustment component 422. The adjustment component 422 can determine a difference between the outputs 416 and the outputs 420 and can update one or more model parameter(s) 424 associated with the machine-learned model 418 to minimize the difference to obtain a trained machine-learned model.

In some examples, the environmental data and/or route data 404 can be combined with the control output 414 and be inputted into the machine-learned model 418. Alternatively, the environmental data and/or route data 404 can be combined with the control output 414 can be separately inputted into the machine-learned model 418. The machine-learned model 418 can determine outputs 426 based on the environmental data and/or route data 404 and the control output 414. Outputs 426 can include, but are not limited to, one or more of estimated breath level temperature, estimated chest level temperature, estimated foot level temperature, estimated airflow rate, etc. The outputs 426 can be provided to the controller(s) 410.

Figure 5:
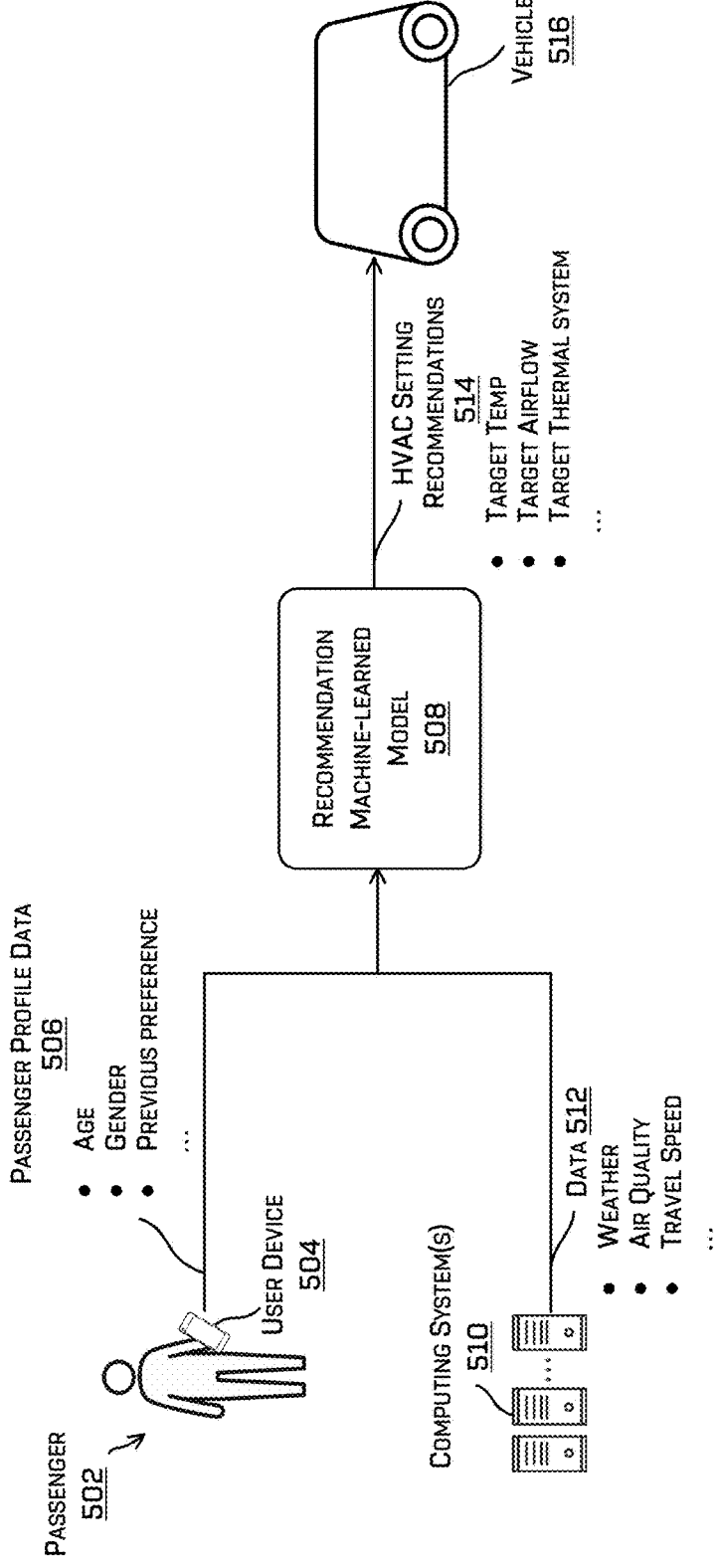
FIG. 5 depicts a block diagram 500 illustrating an example of incremental reinforcement learning to update a vehicle thermal control system, in accordance with examples of the disclosure, in accordance with examples of the disclosure.

FIG. 5 depicts a block diagram 500 illustrating incremental reinforcement learning to update a vehicle thermal control system, in accordance with examples of the disclosure.

For example, techniques can include controlling the climate of a vehicle 516 via machine learning and an online (e.g., real-time or semi-real time) training approach, such as incremental reinforcement learning. As illustrated in FIG. 5, the recommendation machine-learned model 508 can receive data 512 from one or more computing system(s) 510. Data 512 can include public and/or non-public information, such as weather condition, air quality, and/or vehicle speed over the course of the trip to offer a recommended target temperature and comfort air vent position as an initial target value for the cabin climate control. In some examples, the recommendation machine-learned model 508 can receive passenger profile data 506 from a user device 504 associated with a passenger 502 to set initial conditions of the recommendation machine-learned model 508 as well. The passenger profile data 506 can include one or more of age, gender, previous preference, ethnicity, etc. The passenger profile data 506 can be used as input to the recommendation machine-learned model 508 to adjust the target preferences. For example, the recommendation machine-learned model 508 can output one or more thermal setting recommendations 514 based on the passenger profile data 506. The thermal setting recommendations 514 can include, but are not limited to, a target temperature, a target airflow rate, a target thermal management subsystem, etc.

In some examples, such thermal setting recommendations 514 can be sent to the vehicle 516. Alternatively, the thermal setting recommendations 514 can be associated with a user profile and/or can be developed, refined, or otherwise updated based on further inputs from a user during operation. For example, in scenarios where a passenger is increasing or decreasing the cabin climate target setting via the touch screen panel (or via an application accessed via a user device or other interface), signals for rewarding or punishing model recommendations will be sent to the recommendation system based on its decision. Combining the offline and online machine-learned training strategy can be adopted to minimize the memory usage and computation power to allow the recommendation system to automatically adjust itself to be more personal while achieving a rider focused, effortless cabin comfort control goal.

FIG. 6 depicts an example process for training a machine-learned model to determine energy budget data, in accordance with examples of the disclosure. For example, some or all of the process 600 can be performed by one or more components in the autonomous vehicle 200, the architectures 300 and 400, or in the computing system 800, as described below.

At operation 602, the process 600 can include inputting training data into a machine-learned model, the training data include log data annotated with actual energy consumption. The log data is associated with a set of variables, and the machine-learned model is associated with a set of model parameters for the set of variables. The set of variables can include, but are not limited to, one or more of a start location associated with a route, an end location associated with the route, a distance associated with the route, an average velocity associated with the route, map data determined based on the route, elevation data associated with the route, estimated route compute level, ambient environmental conditions associated with the route data (e.g., weather, temperature, air quality, etc. along the route, etc.), weather data, solar load data, ambient temperature data, ambient air quality data, internal environmental conditions associated with the vehicle, internal temperature data, internal zone temperature data, internal air quality data, passenger profile data (e.g., passenger data, passenger age, passenger gender, etc.), traffic data, etc.

At operation 604, the process 600 can include receiving, from the machine-learned model, energy budget data indicating a predicted amount of energy. The energy budget data can include an estimated amount of the energy associated with following a particular route and/or associated with particular environmental conditions. In some examples, determining the energy budget data includes determining an estimated amount of energy needed to control at least one of a propulsion system of the vehicle, a computing system of the vehicle, or a thermal control system of the vehicle from the first location to the second location. For example, the energy budget data can take into account a temperature of one or more component(s) (e.g., one or more thermal management subsystem(s)) of the vehicle while navigating from the first location to the second location.

At operation 606, the process 600 can include determining whether there are any differences between the predicted amount of energy and the actual energy consumption used to navigate the vehicle from the first location to the second location. If there is no difference between the predicted amount of energy and the actual amount of energy ("NO" at operation 606), the process continues to operation 608 to output a trained machine-learned model. If there are differences between the predicted amount of energy and the actual amount of energy ("YES" at operation 606), the process continues to operation 610.

At operation 610, the process 600 can include updating one or more model parameters of the set of model parameters to minimize the differences to obtain a machine-learned model. In some examples, the updated model parameters of the set of model parameters can be stored as log data and be provided to the machine-learned model to continue to train the machine-learned model.

FIG. 7 depicts an example process for controlling one or more setting(s) associated with a vehicle based on the energy budget data, in accordance with examples of the disclosure.

For example, some or all of the process 700 can be performed by one or more components in the autonomous vehicle 200, the architectures 300 and 400, or in the computing system 800, as described below.

At operation 702, the process 700 can include receiving route data associated with a route for a vehicle to travel from a first location to a second location. The route data can include, but are not limited to, one or more of a start location associated with a route, an end location associated with the route, a distance associated with the route, an average velocity associated with the route, map data determined based on the route, elevation data associated with the route, estimated route compute level, current date and time associated with the route, requested pickup time, requested arrival time, etc.

At operation 704, the process 700 can include receiving environmental data representing an environment associated with the route data. The environmental data can include, but are not limited to, one or more of ambient environmental conditions associated with the route data (e.g., weather, temperature, air quality, etc. along the route, etc.), weather data, solar load data, ambient temperature data, ambient air quality data, internal environmental conditions associated with the vehicle, internal temperature data, internal zone temperature data, internal air quality data, passenger profile data (e.g., passenger data, passenger age, passenger gender, etc.), traffic data, etc.

At operation 706, the process 700 can include determining, by a machine-learned model and based at least in part on the route data and/or the environmental data, energy budget data. The energy budget data can include an estimated amount of the energy associated with following a particular route and/or associated with particular environmental conditions.

At operation 708, the process 700 can include determining whether an amount of energy associated with the energy budget data is below an amount of energy associated with a battery system. If the amount of energy associated with the energy budget data is above the amount of energy associated with the battery system ("NO" at operation 708), the process continues to operation 710 to control the vehicle based on unaltered vehicle control and unaltered thermal control. If the amount of energy associated with the energy budget data is below the amount of energy associated with the battery system ("YES" at operation 708), the process continues to operation 712 or operation 716.

At operation 712, the process 700 can include altering at least one of a vehicle control or thermal control based on the energy budget data. The vehicle control can include one or more settings associated with a propulsion system of the vehicle and/or one or more settings associated with a computing system of the vehicle. The thermal control can include one or more settings associated with a thermal control system of the vehicle.

In an example directed to altering the settings associated with the propulsion system of the vehicle, possible modifications of the settings may include, but are not limited to, altering one or more of a route associated with the vehicle, a velocity associated with the vehicle, or the like. For example, the process 700 can include planning a new route and/or adjusting a planned speed to stay within the first amount of power associated with the energy budget data.

In an example directed to altering the settings associated with the computing system of the vehicle, possible modifications of the settings may include, but are not limited to, altering one or more of a number of sensors to use, a sensing range, a level of compute to use, or the like. For example, the process 700 can include reducing the number of sensors to use and/or adjusting the sensing range to stay within the first amount of power associated with the energy budget data.

In an example directed to altering the settings associated with the thermal control system of the vehicle, possible modifications of the settings may include, but are not limited to, altering one or more of a blower control, a compressor control, a vent position control, a heating mode, a cooling mode, or the like. For example, the process 700 can include adjusting a planned temperature and/or changing a planned airflow rate to stay within the first amount of power associated with the energy budget data.

At operation 714, the process 700 can include controlling the vehicle based at least in part on the altered vehicle control or the altered thermal control.

In some examples, if the amount of energy associated with the energy budget data is below the amount of energy associated with the battery system ("YES" at operation 708), the process continues operation 716. At operation 716, the process 700 can include selecting a different vehicle, from along a fleet of vehicles, to use navigate the route.

Figure 8:
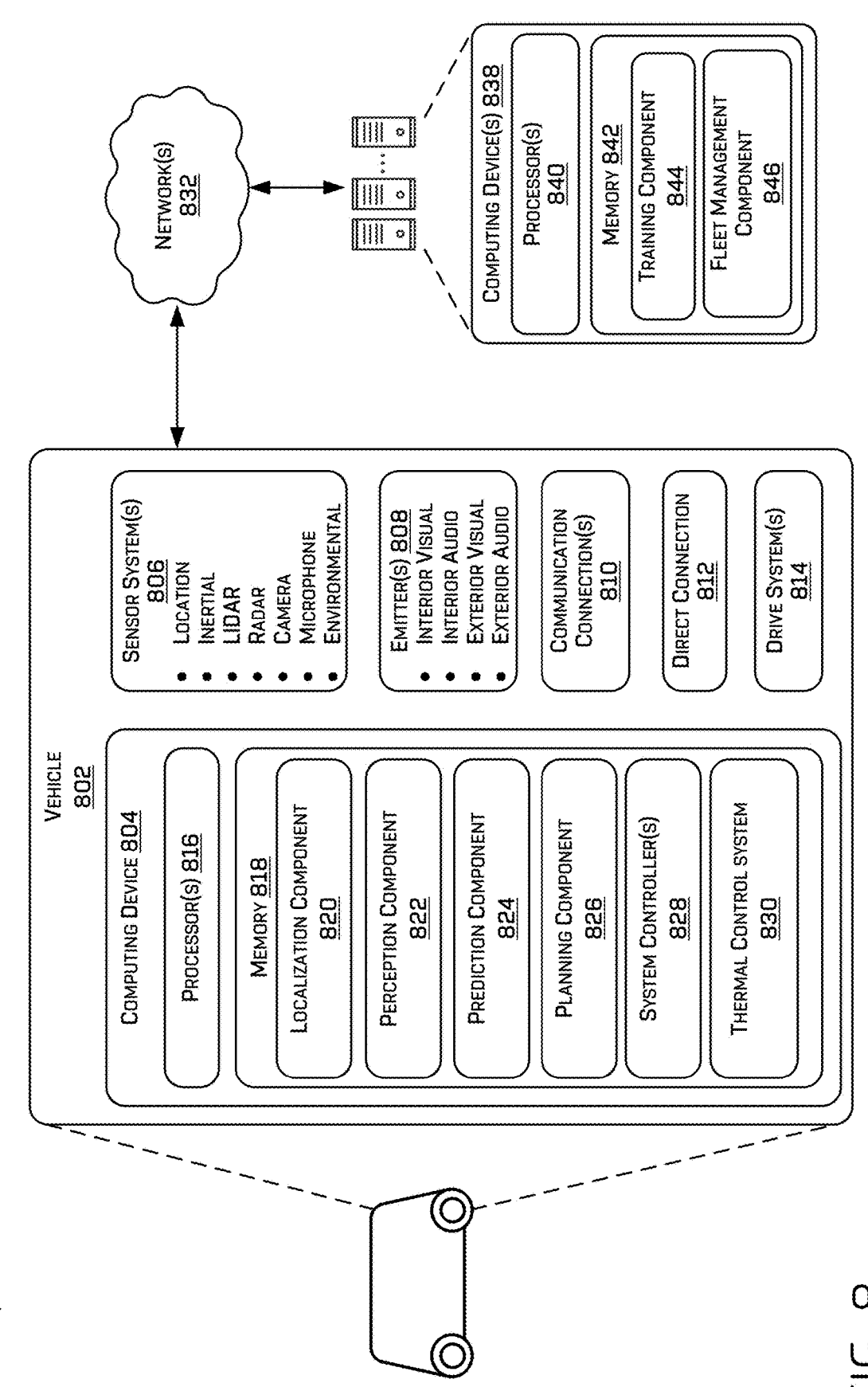
FIG. 8 depicts a block diagram of an example computing system for implementing the techniques described herein.

FIG. 8 is a block diagram illustrating an example system 800 that may be used for performing the techniques described herein. In at least one example, a vehicle 802 can include one or more vehicle computing device(s) 804, one or more sensor system(s) 806, one or more emitter(s) 808, one or more communication connection(s) 810, at least one direct connection 812, and one or more drive system(s) 814.

In at least one example, the vehicle 802 can be an autonomous vehicle configured to operate according to a Level 6 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 802 can be configured to control all functions from start to stop, including all parking functions, it can be unoccupied. This is merely an example, and the components and methods described herein can be incorporated into any ground-borne, airborne, or waterborne vehicle, including those ranging from vehicles that need to be manually controlled by a driver at all times, to those that are partially or fully autonomously controlled. That is, in the illustrated example, the vehicle 802 is an autonomous vehicle; however, the vehicle 802 could be any other type of vehicle. While only a single vehicle 802 is illustrated in FIG. 8, in a practical application, the example vehicle 802 can include a plurality of vehicles, which, in some examples, can comprise a fleet of vehicles.

The vehicle computing device(s) 804 can include processor(s) 816 and memory 818 communicatively coupled with the processor(s) 816. In the illustrated example, the memory 818 of the vehicle computing device(s) 804 stores a localization component 820, a perception component 822, a prediction component 824, a planning component 826, one or more system controller(s) 828, a thermal control system 830.

In at least one example, the localization component 820 can include functionality to receive data from the sensor system(s) 806 to determine a position of a vehicle 802. For example, the localization component 820 can include a three-dimensional map of an environment and can continuously determine a location of the autonomous vehicle within the map. In some instances, the localization component 820 can utilize SLAM (simultaneous localization and mapping) or CLAMS (calibration, localization and mapping, simultaneously) to receive image data, LIDAR data, RADAR data, IMU data, GPS data, or the like to accurately determine a location of the autonomous vehicle. In some instances, the localization component 820 can provide data to various components of the vehicle 802 to determine an initial position of an autonomous vehicle for generating a candidate trajectory, as discussed herein.

In some instances, the perception component 822 can include functionality to perform object detection, segmentation, and/or classification. In some examples, the perception component 822 can provide processed sensor data that indicates a presence of an entity that is proximate to the vehicle 802 and/or a classification of the entity as an entity type (e.g., car, pedestrian, cyclist, unknown, etc.). In additional and/or alternative examples, the perception component 822 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, etc. Characteristics associated with the environment can include, but are not limited to, a presence of another entity in the environment, a state of another entity in the environment, a time of day, a day of a week, a season, a weather condition, an indication of darkness/light, etc.

In general, the prediction component 824 can include functionality to generate one or more probability maps representing prediction probabilities of possible locations of one or more objects in an environment. For example, the prediction component 824 can generate one or more probability maps for vehicles, pedestrians, animals, or the like within a threshold distance from the vehicle 802. In some instances, the prediction component 824 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

In general, the planning component 826 can determine a path for the vehicle 802 to follow to traverse through an environment. For example, the planning component 826 can determine various routes and paths and various levels of detail. In some instances, the planning component 826 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 826 can generate an instruction for guiding the autonomous vehicle along at least a portion of the route from the first location to the second location. In at least one example, the planning component 826 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 826 can alternatively, or additionally, use data from the perception component 822 and/or the prediction component 824 to determine a path for the vehicle 802 to follow to traverse through an environment. For example, the planning component 826 can receive data from the perception component 822 and/or the prediction component 824 regarding objects associated with an environment. Using this data, the planning component 826 can determine a route to travel from a first location (e.g., a current location) to a second location (e.g., a target location) to avoid objects in an environment. In at least some examples, such a planning component 826 may determine there is no such collision free path and, in turn, provide a path which brings vehicle 802 to a safe stop avoiding all collisions and/or otherwise mitigating damage.

The planning component 826 can determine a trajectory-based at least in part on geometric integration of second-order kinematic vehicle models in route-relative coordinates.

In at least one example, the vehicle computing device 804 can include one or more system controllers 828, which can be configured to control steering, propulsion, braking, safety, emitters, communication, and other systems of the vehicle 802. These system controller(s) 828 can communicate with and/or control corresponding systems of the drive system(s) 814 and/or other components of the vehicle 802.

The thermal control system 830 can determine energy budget data based at least in part on route data and/or environment data. The energy budget data can include an estimated amount of the energy associated with following a particular route and/or associated with particular environmental conditions. The route data can include one or more of a start location associated with a route, an end location associated with the route, a distance associated with the route, an average velocity associated with the route, map data determined based on the route, elevation data associated with the route, estimated route compute level, current date and time associated with the route, requested pickup time, requested arrival time, etc. The environmental data can include one or more of ambient environmental conditions associated with the route data, weather data, solar load data, ambient temperature data, ambient air quality data, internal environmental conditions associated with the vehicle, internal temperature data, internal zone temperature data, internal air quality data, passenger profile data, passenger environment preference data, traffic data, or the like.

In some examples, the thermal control system 830 can include a machine-learned model trained to determine the energy budget. The machine-learned model can be trained using log data. For example, training data can be inputted into the machine-learned model, where the training data includes the log data annotated with actual energy consumed during the trip. The log data can be associated with a set of variables, and the machine-learned model can be associated with a set of model parameters for the set of variables. Example variables associated with the log data can include, but are not limited to start location, end location, route distance, vehicle velocities, HVAC temperature, airflow rate, refrigerant temperature, airflow rate, compressor speed, or the like. The machine-learned model can then output the energy budget data representing a predicted amount of energy required to complete the trip (e.g., to navigate from a first location to a second location). The energy budget data can take into account an estimated amount of energy needed to control a temperature of a thermal control system during the trip. The system can determine a difference between the predicted amount of energy required to complete the trip and the actual energy consumed during the trip. The system can further update the machine-learned model based at least in part om the actual energy consumption used to navigate from the first location to the second location. For example, the system can update one or more model parameter(s) of the set of model parameters to minimize the difference and to obtain a trained machined-learned model.

In some examples, the thermal control system 830 can further control at least one of propulsion systems (e.g., included in the drive system(s) 814) of the vehicle, computing systems (e.g., the sensor system(s) 806 and/or emitter(s) 808) of the vehicle, or the thermal control system 830 of the vehicle based at least in part on the energy budget data. For example, the thermal control system 830 can receive battery charge state data associated with a battery system included in the drive system(s) 814 of the vehicle 802 and determine, based on the battery charge state data, that a first amount of power associated with the energy budget data is greater than a second amount of power associated with the battery charge state data. Based on determining the first amount of power is greater than the second amount of power, the thermal control system 830 can alter at least one of one or more setting(s) associated with the propulsion system of the vehicle, one or more setting(s) associated with the computing system of the vehicle, and/or one or more setting(s) associated with the thermal control system 830 of the vehicle.

In an example directed to altering the settings associated with the propulsion system (e.g., included in the drive system(s) 814) of the vehicle, possible modifications of the settings may include, but are not limited to, altering one or more of a route associated with the vehicle, a velocity associated with the vehicle, or the like. For example, the thermal control system 830 can determine an updated route of the vehicle and/or adjust a planned speed to stay within the first amount of power associated with the energy budget data.

In an example directed to altering the settings associated with the computing system of the vehicle, possible modifications of the settings may include, but are not limited to, altering one or more of a number of sensors to use, a sensing range, a level of compute to use, or the like. For example, the thermal control system 830 can reduce the number of sensors to use and/or adjust the sensing range to stay within the first amount of power associated with the energy budget data.

In an example directed to altering the settings associated with the thermal control system 830 of the vehicle, possible modifications of the settings may include, but are not limited to, altering one or more of a blower control, a compressor control, a vent position control, a heating mode, a cooling mode, or the like. For example, the thermal control system 830 can adjust a planned temperature and/or change a planned airflow rate to stay within the first amount of power associated with the energy budget data.

In some instances, aspects of some or all of the components discussed herein may include any models, algorithms, and/or machine learning algorithms. For example, in some instances, the components in the memory 818 may be implemented as a neural network.

As described herein, an exemplary neural network is a biologically inspired algorithm which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), Ada-Boost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, or the like.

In at least one example, the sensor system(s) 806 can include cameras (e.g., RGB, IR, intensity, depth, etc.), microphones, lidar sensors, ToF sensors, ultrasonic range sensors, radar sensors, inertial sensors (e.g., inertial measurement units, accelerometers, magnetometers, gyroscopes, etc.), environment sensors (e.g., temperature sensors, humidity sensors, light sensors, pressure sensors, etc.), sonar sensors, location sensors (e.g., GPS, compass, etc.), wheel encoders, audio sensors, etc. The sensor system(s) 806 can provide input to the vehicle computing device(s) 804. In some examples, the sensor system(s) 806 can preprocess at least some of the sensor data prior to sending the sensor data to the vehicle computing device(s) 804. In at least one example, the sensor system(s) 806 can send sensor data, via the network(s) 832, to the computing device(s) 838 at a particular frequency, after a lapse of a predetermined period of time, in near real-time, etc.

The vehicle 802 can also include one or more emitters 808 for emitting light and/or sound, as described above. The emitter(s) 808 in this example include interior audio and visual emitters to communicate with passengers of the vehicle 802. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), or the like. The emitter(s) 808 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, the emitter(s) 808 can be positioned at various locations about the exterior and/or interior of the vehicle 802.

The vehicle 802 can also include communication connection(s) 810 that enable communication between the vehicle 802 and other local or remote computing device(s), such as the computing device(s) 838, as well as other remote or local computing device(s). For instance, the communication connection(s) 810 can facilitate communication with other local computing device(s) on the vehicle 802 and/or the drive system(s) 814. Also, the communication connection(s) 810 can allow the vehicle to communicate with other nearby computing device(s) (e.g., other nearby vehicles, traffic signals, etc.). The communications connection(s) 810 also enable the vehicle 802 to communicate with a remote teleoperation computing device or other remote services.

The communications connection(s) 810 can include physical and/or logical interfaces for connecting the vehicle computing device(s) 804 to another computing device or a network, such as network(s) 832. For example, the communications connection(s) 810 can enable Wi-Fi-based communication such as via frequencies defined by the IEEE 602.11 standards, short range wireless frequencies such as BLUETOOTH®, or any suitable wired or wireless communications protocol that enables the respective computing device to interface with the other computing device(s).

The direct connection(s) 812 can directly connect the drive system(s) 814 and other systems of the vehicle 802. In at least one example, the vehicle 802 can include drive system(s) 814. In some examples, the vehicle 802 can have a single drive system 814. In at least one example, if the vehicle 802 has multiple drive systems 814, individual drive systems 814 can be positioned on opposite ends of the vehicle 802 (e.g., the front and the rear, etc.). In at least one example, the drive system(s) 814 can include sensor component(s) to detect conditions of the drive system(s) 814 and/or the surroundings of the vehicle 802. By way of example and not limitation, the sensor component(s) can include wheel encoder(s) (e.g., rotary encoders) to sense rotation of the wheels of the drive system, inertial sensors (e.g., inertial measurement units, accelerometers, gyroscopes, magnetometers, etc.) to measure position and acceleration of the drive system, cameras or other image sensors, ultrasonic sensors to acoustically detect objects in the surroundings of the drive system, lidar sensors, radar sensors, etc. Some sensors, such as the wheel encoder(s), can be unique to the drive system(s) 814. In some cases, the sensor component(s) on the drive system(s) 814 can overlap or supplement corresponding systems of the vehicle 802 (e.g., sensor system(s) 806).

The drive system(s) 814 can include many of the vehicle systems, including a high voltage battery, a motor to propel the vehicle 802, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, a the thermal control system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 814 can include a drive system controller which can receive and preprocess data from the sensor component(s) and to control operation of the various vehicle systems. In some examples, the drive system controller can include processor(s) and memory communicatively coupled with the processor(s). The memory can store one or more components to perform various functionalities of the drive system(s) 814. Furthermore, the drive system(s) 814 also include communication connection(s) that enable communication by the respective drive system with other local or remote computing device(s).

In FIG. 8, the vehicle computing device(s) 804, sensor system(s) 806, emitter(s) 808, and the communication connection(s) 810 are shown onboard the vehicle 802. However, in some examples, the vehicle computing device(s) 804, sensor system(s) 806, emitter(s) 808, and the communication connection(s) 810 can be implemented outside of an actual vehicle (i.e., not onboard the vehicle 802).

As described above, the vehicle 802 can send data to the computing device(s) 838, via the network(s) 832. In some examples, the vehicle 802 can send raw sensor data to the computing device(s) 838. In other examples, the vehicle 802 can send processed sensor data and/or representations of sensor data to the computing device(s) 838 (e.g., data output from the localization component 820, the perception component 822, the prediction component 824, the planning component 826, the thermal control system 830, etc.). In some examples, the vehicle 802 can send data to the computing device(s) 838 at a particular frequency, after a lapse of a predetermined period of time, in near real-time, etc.

The computing device(s) 838 can receive the data (raw or processed) from the vehicle 802 and/or other data collection devices, as well as data from one or more third party sources and/or systems. In at least one example, the computing device(s) 838 can include processor(s) 840 and memory 842 communicatively coupled with the processor(s) 816. In the illustrated example, the memory 842 of the computing device(s) 838 stores a training component 844. The training component 844 includes functionality for training one or more machine-learned model(s) configured to determine energy budget data, which may correspond with the thermal control system 830. In the illustrated example, the memory 842 of the computing device(s) 838 further stores a fleet management component 846, which is configured to determine, based at least in part on the energy budget data, a vehicle of a plurality of vehicles to dispatch. For example, the fleet management component 846 can receive battery charge state data associated with a plurality of battery systems associated with a plurality of vehicles and energy budget data. The system can determine, based at least in part on the energy budget and the battery charge state data, the vehicle of the plurality of vehicles to dispatch for a route and deploy the vehicle based on route data.

The processor(s) 816 of the vehicle 802 and the processor(s) 840 of the computing device(s) 838 can be any suitable processor capable of executing instructions to process data and perform operations as described herein. By way of example and not limitation, the processor(s) 816 and 840 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 818 and 842 are examples of non-transitory computer-readable media. Memory 818 and 842 can store an operating system and one or more software applications, instructions, programs, and/or data to implement the methods described herein and the functions attributed to the various systems. In various implementations, the memory can be implemented using any suitable memory technology, such as static random receive memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 8 is illustrated as a distributed system, in some examples, components of the vehicle 802 can be associated with the computing device(s) 838 and/or the components of the computing device(s) 838 can be associated with the vehicle 802. That is, the vehicle 802 can perform one or more of the functions associated with the computing device(s) 838, and vice versa.

Furthermore, while the vehicle computing device(s) 804 and the computing device(s) 838 are shown to include multiple components, in some examples, such components can be associated with more or fewer individual components. For example, the localization component 820, the perception component 822, the prediction component 824, the planning component 826, and/or the thermal control system 830 can be combined into a single component. That is, while depicted as separate components, any one or more of the components can be combined.

EXAMPLE CLAUSES

A: A system comprising: one or more processors; non-transitory memory communicatively coupled to the one or more processors; one or more components stored in the non-transitory memory and executable by the one or more processors to perform operations comprising: receiving route data associated with a route for a vehicle to travel from a first location to a second location; receiving environmental data representing an environment associated with the route data; determining based at least in part on at least one of the route data or the environmental data, energy budget data, the energy budget data taking into account an estimated amount of energy needed control a temperature of one or more components of the vehicle while navigating from the first location to the second location; and controlling at least one of a propulsion system of the vehicle, a computing system of the vehicle, or a thermal control system of the vehicle based at least in part on the energy budget data.

B: The system as paragraph A recites, wherein the energy budget data is determined by a machine-learned model, the operations further comprising: measuring an actual energy consumption used to navigate the vehicle from the first location to the second location; and updating the machine-learned model based at least in part on the actual energy consumption used to navigate the vehicle from the first location to the second location.

C: The system as paragraph A or B recites, wherein the route data comprises at least one of: route distance; route velocity data; map data; estimated route compute level; current day of year; current time of day; or arrival time, and wherein the environmental data includes at least one of: ambient environmental conditions associated with the route data; weather data; solar load data; ambient temperature data; ambient air quality data; internal environmental conditions associated with the vehicle; internal temperature data; internal zone temperature data; internal air quality data; passenger data; passenger age; passenger gender; passenger environment preference data; or traffic data.

D: The system as any of paragraphs A-C recite, the operations further comprising: receiving battery charge state data associated with a battery system of the vehicle; determining, based on the battery charge state data, that a first amount of power associated with the energy budget data is greater than a second amount of power associated with the battery charge state data; and altering at least one of a vehicle control or thermal control based at least in part on the first amount of power being greater than the second amount of power.

E: The system as any of paragraphs A-D recite, wherein controlling at least one of the propulsion system, the computing system, or the thermal control system comprises controlling the propulsion system, the operations further comprising one or more of: determining, based on the energy budget data, at least one of a range of the vehicle, an updated route of the vehicle, or a velocity of the vehicle; determining, based on the energy budget data, at least one of a number of sensors to use, a sensing range, or a level of compute to use; or determining, based at least in part on the energy budget data, at least one of a blower control, a compressor control, a vent position control, a heating mode, or a cooling mode.

F: A method comprising: receiving route data associated with a route for a vehicle to travel from a first location to a second location; receiving environmental data representing an environment associated with the route data; determining, based at least in part on the route data or the environmental data, energy budget data, the energy budget data including an estimate of thermal management; and controlling at least one of a propulsion system of the vehicle, a computing system of the vehicle, or a thermal control system of the vehicle based at least in part on the energy budget data.

G: The method as paragraph F recites, wherein determining the energy budget data comprises: inputting at least one of the route data or the environmental data to a machine-learned model; and receiving, from the machine-learned model, the energy budget data.

H: The method as paragraph F or G recites, further comprising: measuring an actual energy consumption used to navigate the vehicle from the first location to the second location; and updating the machine-learned model based at least in part on the actual energy consumption used to navigate the vehicle from the first location to the second location.

I: The method as any of paragraph F-H recite, wherein the route data is associated with transporting a passenger from the first location to the second location.

J: The method as any of paragraph F-I recite, wherein the route data comprises at least one of: route distance; route velocity data; map data; estimated route compute level; current day of year; current time of day; or arrival time.

K: The method as any of paragraph F-J recite, wherein the environmental data includes at least one of: ambient environmental conditions associated with the route data; weather data; solar load data; ambient temperature data; ambient air quality data; internal environmental conditions associated with the vehicle; internal temperature data; internal zone temperature data; internal air quality data; passenger data; passenger age; passenger gender; passenger environment preference data; or traffic data.

L: The method as any of paragraph F-K recite, further comprising: receiving battery charge state data associated with a battery system of the vehicle; determining, based on the battery charge state data, that a first amount of power associated with the energy budget data is greater than a second amount of power associated with the battery charge state data; and altering at least one of a vehicle control or thermal control based at least in part on the first amount of power being greater than the second amount of power.

M: The method as any of paragraph F-L recite, further comprising: receiving battery charge state data associated with a plurality of battery systems associated with a plurality of vehicles; determining, based at least in part on the energy budget data and the battery charge state data, the vehicle of the plurality of vehicles to dispatch for the route; and deploying the vehicle based on the route data.

N: The method as any of paragraph F-M recite, wherein the environmental data comprises first passenger environment preference data associated with a first passenger and second passenger environment preference data associated with a second passenger, the method further comprising: determining the energy budget data based at least in part on the first passenger environment preference data and the second passenger environment preference data.

O: The method as any of paragraph F-N recite, wherein the environmental data comprises passenger environment preference data representing at least one of: a preferred temperature; a preferred vent position; a preferred air speed; a preferred seat; a preferred seat temperature; a preferred heating mode; a preferred tinting setting.

P: The method as any of paragraph F-O recite, wherein controlling at least one of the propulsion system, the computing system, or the thermal control system comprises controlling the propulsion system, the method further comprising: determining, based on the energy budget data, at least one of a range of the vehicle, an updated route of the vehicle, or a velocity of the vehicle.

Q: The method as any of paragraph F-P recite, wherein controlling at least one of the propulsion system, the computing system, or the thermal control system comprises controlling the computing system, the method further comprising: determining, based on the energy budget data, at least one of a number of sensors to use, a sensing range, or a level of compute to use.

R: The method as any of paragraph F-Q recite, wherein controlling at least one of the propulsion system, the computing system, or the thermal control system comprises controlling the thermal control system, the method further comprising: determining, based at least in part on the energy budget data, at least one of a blower control, a compressor control, a vent position control, a heating mode, or a cooling mode.

S: The method as any of paragraph F-R recite, wherein determining the energy budget data comprises: determining an estimated amount of energy needed to control the at least one of the propulsion system of the vehicle, the computing system of the vehicle, or the thermal control system of the vehicle from the first location to the second location.

T: One or more non-transitory computer-readable media storing instructions executable by one or more processors, wherein the instructions, when executed, cause the one or more processors to perform operations comprising: receiving route data associated with a route for a vehicle to travel from a first location to a second location; receiving environmental data representing an environment associated with the route data; determining based at least in part on the route data or the environmental data, energy budget data; and controlling at least one of a propulsion system of the vehicle, a computing system of the vehicle, or a thermal control system of the vehicle based at least in part on the energy budget data.

While the example clauses described above are described with respect to one particular implementation, it should be understood that, in the context of this document, the content of the example clauses may also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
non-transitory memory communicatively coupled to the one or more processors storing computer executable instructions that, when executed, cause the one or more processors to perform operations comprising:
receiving route data associated with a route for a vehicle to travel from a first location to a second location;
receiving environmental data representing an environment associated with the route data, wherein the environmental data comprises a first portion associated with conditions of the environment and a second portion associated with passenger preferences;
determining energy budget data, the energy budget data taking into account an estimated amount of energy needed to control a temperature of one or more components of the vehicle while navigating from the first location to the second location, wherein the energy budget data is determined based at least in part on:
the second portion of the environmental data, wherein the second portion includes passenger environment preference data comprising a passenger preference associated with at least one vent position, seat temperature, air speed, temperature control mode, seating location, or window tinting setting;
at least one of the route data or the first portion of the environmental data;
one or more estimated temperatures associated with areas of a cabin of the vehicle relative to a seat of the vehicle;
a machine-learned model comprising an adjustment to the machine-learned model, wherein:
the machine-learned model is configured to output:
one or more first outputs, the one or more first outputs being associated with a first energy amount needed to maintain a healthy performance of one or more vehicle components, and
one or more second outputs, the one or more second outputs being associated with a second energy amount needed to meet the passenger preferences; and
the adjustment is based at least in part on:
a difference between a previous estimated energy consumption and an actual previous energy consumption associated with controls used when navigating the vehicle from the first location to the second location,
one or more first altered parameters, the one or more first altered parameters associated with the one or more first outputs, and
one or more second altered parameters, the one or more second altered parameters associated with the one or more second outputs; and
controlling at least one of a propulsion system of the vehicle, a computing system of the vehicle, or a thermal control system of the vehicle based at least in part on the energy budget data.

2. The system of claim 1, wherein the route data comprises at least one of:
route distance;
route velocity data;
map data;
estimated route compute level;
current day of year;
current time of day; or
arrival time, and wherein the environmental data includes at least one of:

ambient environmental conditions associated with the route data;

weather data;

solar load data;

ambient temperature data;

ambient air quality data;

internal environmental conditions associated with the vehicle;

internal temperature data;

internal zone temperature data;

internal air quality data;

passenger data;

passenger age;

passenger gender;

the passenger environment preference data; or traffic data.

3. The system of claim 1, the operations further comprising:

receiving battery charge state data associated with a battery system of the vehicle;

determining, based on the battery charge state data, that a first amount of power associated with the energy budget data is greater than a second amount of power associated with the battery charge state data; and altering at least one of a vehicle control or thermal control based at least in part on the first amount of power being greater than the second amount of power.

4. The system of claim 1, wherein controlling at least one of the propulsion system, the computing system, or the thermal control system comprises controlling the propulsion system, the operations further comprising one or more of:

determining, based on the energy budget data, at least one of a range of the vehicle, an updated route of the vehicle, or a velocity of the vehicle;

determining, based on the energy budget data, at least one of a number of sensors to use, a sensing range, or a level of compute to use; or determining, based at least in part on the energy budget data, at least one of a blower control, a compressor control, a vent position control, a heating mode, or a cooling mode.

5. The system of claim 1, wherein the energy budget data is based at least in part on an estimated compute stress associated with the route data, wherein the estimated compute stress is based at least in part on a complexity associated with the first portion of the environmental data.

6. The system of claim 1, wherein:

the second portion of the environmental data comprises first passenger environment preference data associated with a first passenger and second passenger environment preference data associated with a second passenger; and controlling at least one of the propulsion system, the computing system, or the thermal control system comprises a first control relative to a first area of the cabin associated with the first passenger and a second control relative to a second area of the cabin associated with the second passenger, wherein the first control is based at least in part on the first passenger environment preference data and the second control is based at least in part on the second passenger environment preference data.

7. A method comprising:

receiving route data associated with a route for a vehicle to travel from a first location to a second location;

receiving environmental data representing an environment associated with the route data, wherein the environmental data comprises a first portion associated with conditions of the environment and a second portion associated with passenger preferences;

determining energy budget data, the energy budget data including an estimate of thermal management, wherein the energy budget data is determined based at least in part on:

the second portion of the environmental data, wherein the second portion includes passenger environment preference data comprising a passenger preference associated with at least one of vent position, seat temperature, air speed, temperature control mode, seating location, or window tinting setting;

at least one of the route data or the first portion of the environmental data;

one or more estimated temperatures associated with areas of a cabin of the vehicle;

a machine-learned model comprising an adjustment to the machine-learned model, wherein:

the machine-learned model is configured to output:

one or more first outputs, the one or more first outputs being associated with a first energy amount needed to maintain a healthy performance of one or more vehicle components, and one or more second outputs, the one or more second outputs being associated with a second energy amount needed to meet the passenger preferences; and the adjustment is based at least in part on:

a difference between a previous machine-learned model output associated with an estimated control and an actual previous control, one or more first altered parameters, the one or more first altered parameters associated with the one or more first outputs, and one or more second altered parameters, the one or more second altered parameters associated with the one or more second outputs; and controlling at least one of a propulsion system of the vehicle, a computing system of the vehicle, or a thermal control system of the vehicle based at least in part on the energy budget data.

8. The method of claim 7, wherein determining the energy budget data comprises:

inputting at least one of the route data or the environmental data to the machine-learned model; and receiving, from the machine-learned model, the energy budget data.

9. The method of claim 7, further comprising:

measuring an actual energy consumption used to navigate the vehicle from the first location to the second location; and updating the machine-learned model based at least in part on the actual energy consumption used to navigate the vehicle from the first location to the second location.

10. The method of claim 7, wherein the route data is associated with transporting a passenger from the first location to the second location.

11. The method of claim 7, wherein the route data comprises at least one of:

route distance;

route velocity data;

map data;

estimated route compute level;

current day of year;

current time of day; or arrival time.

12. The method of claim 7, wherein the environmental data includes at least one of:

ambient environmental conditions associated with the route data;

weather data;

solar load data;

ambient temperature data;

ambient air quality data;

internal environmental conditions associated with the vehicle;

internal temperature data;

internal zone temperature data;

internal air quality data;

passenger data;

passenger age;

passenger gender;

or traffic data.

13. The method of claim 7, further comprising:

receiving battery charge state data associated with a battery system of the vehicle;

determining, based on the battery charge state data, that a first amount of power associated with the energy budget data is greater than a second amount of power associated with the battery charge state data; and altering at least one of a vehicle control or thermal control based at least in part on the first amount of power being greater than the second amount of power.

14. The method of claim 7, further comprising:

receiving battery charge state data associated with a plurality of battery systems associated with a plurality of vehicles;

determining, based at least in part on the energy budget data and the battery charge state data, the vehicle of the plurality of vehicles to dispatch for the route; and deploying the vehicle based on the route data.

15. The method of claim 7, wherein the second portion of the environmental data comprises first passenger environment preference data associated with a first passenger and second passenger environment preference data associated with a second passenger, the method further comprising:

determining the energy budget data based at least in part on the first passenger environment preference data and the second passenger environment preference data.

16. The method of claim 7, wherein controlling at least one of the propulsion system, the computing system, or the thermal control system comprises controlling the propulsion system, the method further comprising:

determining, based on the energy budget data, at least one of a range of the vehicle, an updated route of the vehicle, or a velocity of the vehicle.

17. The method of claim 7, wherein controlling at least one of the propulsion system, the computing system, or the thermal control system comprises controlling the computing system, the method further comprising:

determining, based on the energy budget data, at least one of a number of sensors to use, a sensing range, or a level of compute to use.

18. The method of claim 7, wherein controlling at least one of the propulsion system, the computing system, or the thermal control system comprises controlling the thermal control system, the method further comprising:

determining, based at least in part on the energy budget data, at least one of a blower control, a compressor control, a vent position control, a heating mode, or a cooling mode.

19. The method of claim 7, wherein determining the energy budget data comprises:

determining an estimated amount of energy needed to control the at least one of the propulsion system of the vehicle, the computing system of the vehicle, or the thermal control system of the vehicle from the first location to the second location.

20. One or more non-transitory computer-readable media storing instructions executable by one or more processors, wherein the instructions, when executed, cause the one or more processors to perform operations comprising:

receiving route data associated with a route for a vehicle to travel from a first location to a second location;

receiving environmental data representing an environment associated with the route data, wherein the environmental data comprises a first portion associated with conditions of the environment and a second portion associated with passenger preferences, the passenger preferences comprising a first passenger preference data associated with a first passenger and a second passenger preference data associated with a second passenger;

determining energy budget data, wherein the energy budget data is determined based at least in part on:

the second portion of the environmental data, wherein the second portion includes, for each of the first passenger preference data and the second passenger preference data, passenger environment preference data comprising a passenger preference associated with at least one of vent position, seat temperature, air speed, temperature control mode, seating location, or window tinting setting;

at least one of the route data or the first portion of the environmental data;

one or more estimated temperatures associated with at least one of a breath level, chest level, or foot level, wherein the breath level, chest level, or foot level are areas of a cabin of the vehicle relative to a seat of the vehicle; and a machine-learned model comprising an adjustment to the machine-learned model, wherein the adjustment is based at least in part on a difference between a previous estimated energy consumption and an actual previous energy consumption; and controlling at least one of a propulsion system of the vehicle, a computing system of the vehicle, or a thermal control system of the vehicle based at least in part on the energy budget data, wherein controlling at least one of the propulsion system, the computing system, or the thermal control system comprises:

a first control relative to a first area of the cabin associated with the first passenger and based at least in part on the first passenger preference data, a second control relative to a second area of the cabin associated with the second passenger and based at least in part on the second passenger preference data, and the first control and the second control being performed along the route.

* * * * *